United States Patent
Nakada et al.

(10) Patent No.: US 7,162,396 B2
(45) Date of Patent: Jan. 9, 2007

(54) MEASUREMENT DATA DISPLAYING DEVICE, METHOD, AND PROGRAM, AND RECORDING MEDIUM ON WHICH THE PROGRAM IS RECORDED

(75) Inventors: Juichi Nakada, Gunma (JP); Eiji Nishino, Saitama (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 10/482,386

(22) PCT Filed: Jul. 4, 2002

(86) PCT No.: PCT/JP02/06774

§ 371 (c)(1),
(2), (4) Date: Jul. 20, 2004

(87) PCT Pub. No.: WO03/005618

PCT Pub. Date: Jan. 16, 2003

(65) Prior Publication Data

US 2004/0243357 A1 Dec. 2, 2004

(30) Foreign Application Priority Data

Jul. 6, 2001 (JP) .............................. 2001-206895

(51) Int. Cl.
  *H04B 7/216* (2006.01)
(52) U.S. Cl. ................... 702/189; 702/67; 702/127; 702/191; 370/335
(58) Field of Classification Search ............... 702/189, 702/60, 62, 66, 67, 69, 70, 74–76, 127, 122, 702/124, 126, 190, 198; 370/342, 335, 241, 370/252, 320, 441, 209; 455/522, 423–425, 455/67.11, 67.13, 67.7, 115.1, 115.3, 115.4, 455/226.1, 226.2, 226.4; 375/130, 224, 228, 375/135, 146
See application file for complete search history.

(56) References Cited

U.S. PATENT DOCUMENTS

| 6,219,340 | B1 | 4/2001 | Cutler et al. ............... 370/241 |
| 6,519,227 | B1* | 2/2003 | Koizumi ..................... 370/241 |
| 2002/0093991 | A1* | 7/2002 | Kurihara et al. ............ 370/535 |
| 2004/0022182 | A1* | 2/2004 | Koizumi et al. ............ 370/208 |
| 2004/0039763 | A1* | 2/2004 | Koizumi et al. ............ 708/300 |

FOREIGN PATENT DOCUMENTS

| CA | 2354856 | | 2/2002 |
| CN | 1338836 A | * | 3/2002 |
| DE | 19955564 | | 5/2000 |

(Continued)

OTHER PUBLICATIONS

Agilent Designing and Testing 3GPP W-CDMA User Equipment, Agilent Technologies Application Note 1356.*

(Continued)

*Primary Examiner*—Hal Wachsman
(74) *Attorney, Agent, or Firm*—Lowe Hauptman & Berner LLP

(57) ABSTRACT

A measurement data displaying device includes a measurement data recording unit and charge displaying unit. The measurement data recording unit records a measurement subject channel, a spreading code length corresponding to the measurement subject channel and measurement data which is a code domain power or noise component power of the measurement subject channel. The chart displaying unit displays a chart having a constant width, and represents the measurement data in a display area whose position is determined by the measurement subject channel and the spreading code length, and which has a width corresponding to the spreading code length.

16 Claims, 26 Drawing Sheets

FOREIGN PATENT DOCUMENTS

| | | |
|---|---|---|
| EP | 1179736 | 2/2002 |
| GB | 2338378 | 12/1999 |
| JP | 9-298567 A * | 11/1997 |
| JP | 2000-036802 | 2/2000 |
| JP | 2000-36802 A | 2/2000 |
| JP | 2000-216754 | 8/2000 |
| JP | 2000-216754 A | 8/2000 |
| JP | 2002-057651 | 2/2002 |
| JP | 2002-57651 A | 2/2002 |

OTHER PUBLICATIONS

Translation of JP 2000-036802, Feb. 2000.*
Translation of JP 2002-057651, Feb. 2002.*
Translation of JP 9-298567, Nov. 1997.*
Translation of JP 2000-216754, Aug. 2000.*

* cited by examiner

| Spreading Code Length | Width of Display Area |
|---|---|
| 4 | 1/4 |
| 8 | 1/8 |
| 16 | 1/16 |
| 32 | 1/32 |
| 64 | 1/64 |
| 128 | 1/128 |

_(1)_

MEASUREMENT DATA DISPLAYING DEVICE, METHOD, AND PROGRAM, AND RECORDING MEDIUM ON WHICH THE PROGRAM IS RECORDED

TECHNICAL FIELD

The present invention relates to a display of a measurement result of the code domain power in coded multiplex type communication such as CDMA communication method.

BACKGROUND ART

FIG. 26 shows an example of a display of a measurement result of the code domain powers in the CDMA communication method.

In FIG. 26, the vertical axis W indicates the power. The horizontal axis indicates channels CH. The example shown in FIG. 26 shows such a state that the communication method is cdma 2000, the Walsh length is "64", a communication line with 64 channels is prepared for connection, and the channels 0, 1, 3, 5, 7, 9, 11, 13, . . . , 61, 63 are transmitting signals.

However, since the code domain powers of the CDMA signal are shown, while the Walsh length is fixed to "64", it is not possible to view the code domain powers for a different Walsh length. A standard is currently designed for a CDMA signal used for the portable phone in order to switch the Walsh length among six kinds, 4, 8, 16, 32, 64, and 128. Consequently, this display is inconvenient since the code domain powers can be viewed only for a code layer specified by a specific Walsh length.

This problem still exists even if the communication method is W-CDMA. Namely, the code domain powers are viewed only for a code layer specified by a specific spreading factor.

In view of the foregoing, the object of the present invention is to simultaneously show measurement data such as code domain powers on a plurality of kinds of code layers.

DISCLOSURE OF THE INVENTION

According to an aspect of the present invention, a measurement data displaying device includes: a measurement data recording unit for recording a measurement subject channel, a spreading code length corresponding to the measurement subject channel, and measurement data related to the measurement subject channel; and a chart displaying unit for displaying a chart having a constant width, and representing the measurement data in a display area whose position is determined by the measurement subject channel and the spreading code length, and including a width corresponding to the spreading code length.

The measurement data implied herein means data measured for a measurement subject channel such as the power (code domain power) and the noise component power.

According to the above mentioned aspect, the measurement data displaying device can further include a display form changing unit for changing a display form of the display area depending on whether the measurement subject channel is active or not.

According to the measurement data displaying device constituted as described above, since the display area has the width corresponding to the spreading code length, and the display form of the display area is changed according to whether the measurement subject channel is active or not, even when measurement data such as the code domain powers and the like for a plurality of kinds of code layers are simultaneously shown, it is possible to tell to which code layer the code domain powers and the like belong.

The measurement data displaying device mentioned above can, in accordance with one embodiment be such that the display area has lines spaced by the width of the display area.

According to the measurement data displaying device constituted as described above, since the display area has the width corresponding to the spreading code length, and the ruled lines spaced by the width of the display area are drawn, even when measurement data such as the code domain powers and the like for a plurality of kinds of code layers are simultaneously shown, it is possible to tell to which code layer the code domain powers and the like belong.

The measurement data displaying device mentioned above can, in accordance with an embodiment of the invention, be such that the display form changing unit does not change the display form for a display area with the narrowest width whether the measurement subject channel is active or not.

In accordance with the above mentioned aspect, the measurement data displaying device can further comprise a display form recording unit for recording a display form corresponding to a modulation method related to the measurement subject channel, wherein the display form changing unit changes the display area into the display form recorded in the display form recording unit.

The above mentioned measurement data displaying device can also be characterized by further including: an auxiliary display area forming unit for forming an auxiliary display area disposed at the bottom of the display area, and having a predetermined height; a display form recording unit for recording a display form corresponding to a modulation method related to the measurement subject channel; and an auxiliary-display-area display form changing unit for changing the auxiliary display area into the display form recorded in the display form recording unit.

According to the measurement data displaying device constituted as described above, since the auxiliary display area is formed at the bottom of the display area having the width corresponding to the spreading code length, and the display form of the auxiliary display area is changed depending on the modulation method, even when measurement data such as the code domain powers and the like for a plurality of kinds of code layers are simultaneously shown, it is possible to tell to which code layer the code domain powers and the like belong.

The measurement data displaying device mentioned above can be such that the auxiliary display area has a border line.

According to the above mentioned aspect of the invention, the measurement data displaying device can further include a chart display form changing unit for changing the chart in active into the display form recorded in the display form recording unit.

According to the above mentioned aspect of the invention the measurement data displaying device can be such as to include an auxiliary-display-area display form changing unit for changing a display form of the auxiliary display area depending on whether the measurement subject channel is active or not.

According to the measurement data displaying device constituted as described above, since the auxiliary display area is formed at the bottom of the display area having the width corresponding to the spreading code length, and the display form of the auxiliary display area is changed depending on whether the measurement subject channel is active or not, even when measurement data such as the code domain powers and the like for a plurality of kinds of code layers are simultaneously shown, it is possible to tell to which code layer the code domain powers and the like belong.

The above mentioned measurement data displaying device can be such that the height of the auxiliary display area corresponds to a threshold discriminating whether the measurement subject channel is active or not.

The measurement data displaying device mentioned above can be such that the display form changing unit colors the display area in a predetermined color tone depending on whether the measurement subject channel is active or not.

The measurement data displaying device mentioned above can be such that the display form changing unit shows the display area in a predetermined color tone depending on whether the measurement subject channel is active or not.

According to another aspect of the invention, a measurement data displaying method of a measurement data displaying device having a measurement data recording unit for recording a measurement data and a chart displaying unit for displaying a chart, can be such as to make use of: a measurement data recording step for recording in the measurement data recording unit a measurement subject channel, a spreading code length corresponding to the measurement subject channel, and measurement data related to the measurement subject channel; and a chart displaying step for displaying by the chart displaying unit a chart having a constant width, and representing the measurement data in a display area whose position is determined by the measurement subject channel and the spreading code length, and including a width corresponding to the spreading code length.

In accordance with another aspect of the present invention a program of instructions for executing a displaying process by the computer of a measurement data displaying device having a measurement data recording unit for recording a measurement data and a chart displaying unit for displaying a chart, can be such that the displaying process makes use of: a measurement data recording step for recording in the measurement data recording unit a measurement subject channel, a spreading code length corresponding to the measurement subject channel, and measurement data related to the measurement subject channel; and a chart displaying step for displaying by the chart displaying unit a chart having a constant width, and representing the measurement data in a display area whose position is determined by the measurement subject channel and the spreading code length, and including a width corresponding to the spreading code length.

In accordance with another aspect of the invention, a computer-readable medium having a program of instructions for executing a displaying process by the computer of a measurement data displaying device having a measurement data recording unit for recording a measurement data and a chart displaying unit for displaying a chart, can make use of a displaying process including: a measurement data recording step for recording in the measurement data recording unit a measurement subject channel, a spreading code length corresponding to the measurement subject channel, and measurement data related to the measurement subject channel; and a chart displaying step for displaying by the chart displaying unit a chart having a constant width, and representing the measurement data in a display area whose position is determined by the measurement subject channel and the spreading code length, and including a width corresponding to the spreading code length.

BRIEF DESCRIPTION OF THE DRAWINGS

FIG. 3 shows what a display width recording unit 310 records;

BEST MODE FOR CARRYING OUT THE INVENTION

The following section describes embodiments of the present invention referring to drawings.

Figure 1:
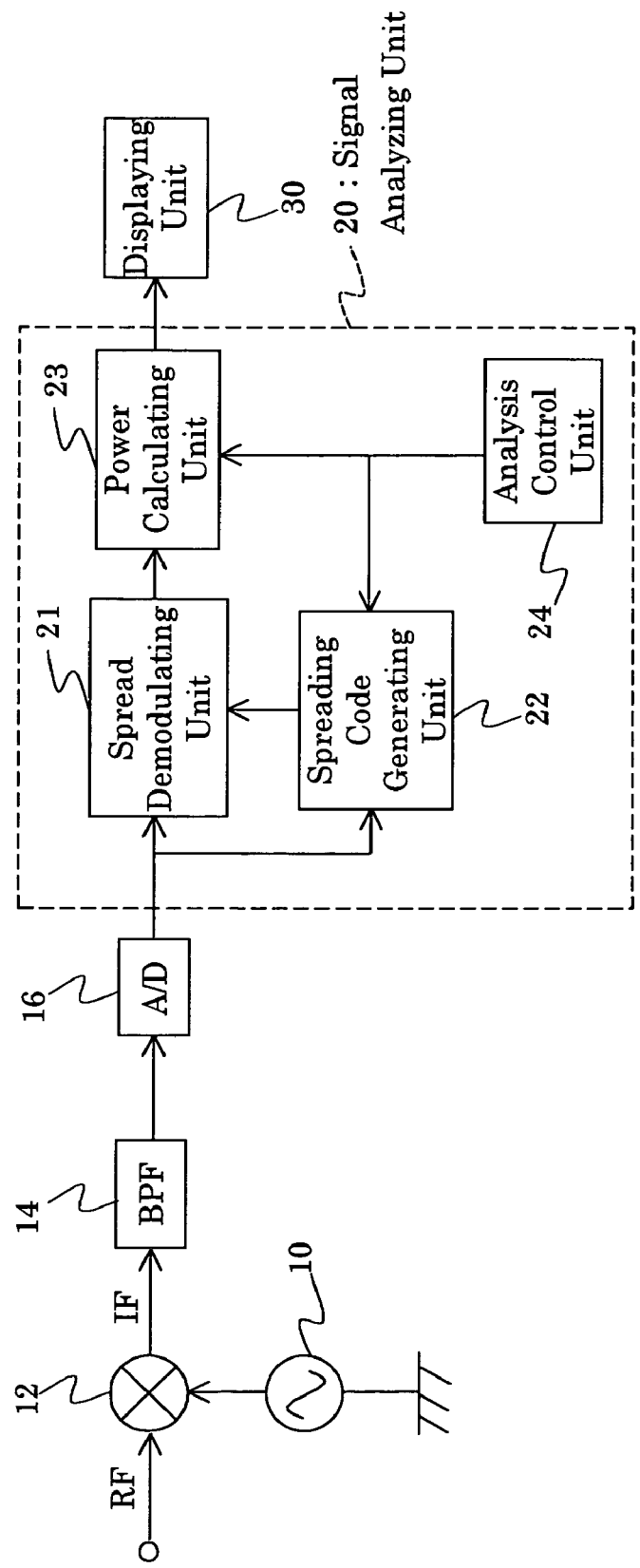
FIG. 1 is a block diagram showing the constitution of a measurement data displaying device according to an embodiment of the present invention.

FIG. 1 is a block diagram showing the constitution of a measurement data displaying device according to an embodiment of the present invention. The measurement data displaying device according to the embodiment of the present invention carries out power measurement on respective measurement subject channels of a received signal compliant to cdma 2000.

The measurement data displaying device includes a local oscillator 10, a mixer 12, a band-pass filter (BPF) 14, an analog/digital (A/D) converter 16, a signal analyzing unit 20, and a displaying unit 30.

The local oscillator 10 generates a predetermined local signal used for frequency conversion. The mixer 12 mixes the local signal output from the local oscillator 10 and the input signal compliant to cdma 2000 (RF: Radio Frequency) with each other so as to output an analog intermediate frequency (IF: Intermediate Frequency) signal which is a difference between these signals. The frequency of this IF signal is a frequency which the A/D converter 16 on a later stage can convert into digital data. The band-pass filter 14 applies a band limiting to the IF signal output from the mixer 12, thereby removing an aliasing component included in the IF signal. The A/D converter 16 converts the input IF signal into digital data for various kinds of processing in the signal analyzing unit 20 on the following stage.

The signal analyzing unit 20 calculates powers in the respective channels of the received signal compliant to the cdma 2000 based on the IF signal after being converted into the digital data by the A/D converter 16. This signal analyzing unit 20 includes a spread demodulating unit 21, a spreading code generating unit 22, a power calculating unit 23, and an analysis control unit 24.

The spread demodulating unit 21 uses a spreading code to apply despreading (spread demodulation) to the received signal which has been spread-modulated, thereby recovering a signal in the same state as that before modulation on a sending side. The spreading code generating unit 22 generates the spreading code used in the despreading carried out by the spread demodulating unit 21, and supplies the spread demodulating unit 21 with the generated code.

The power calculating unit 23 uses the data after being despreaded by the spread demodulating unit 21 to calculate powers for respective measurement subject channels. For example, in a case where QPSK modulation is used, the power calculating unit 23 separates an inphase component I and a quadrature component Q of the signal after the spread demodulation, and then, obtains $I^2+Q^2$ by adding values which are the respective squared components, thereby obtaining powers on the respective measurement subject channels. In addition, the power calculating unit 23 outputs the spreading code length and the measurement subject channels. The outputs from the power calculating unit 23 serve as outputs from the signal analyzing unit 20.

Note that, in place of the power calculating unit 23, means for measuring data for the respective measurement subject channel such as means for calculating a noise component power for the respective measurement subject channel may be provided. In this case, data output from the power calculating unit 23 are data measured for the respective measurement subject channels.

The analysis control unit 24 sends an instruction of generating the spreading code to the spreading code generating unit 22, and simultaneously, sends an instruction of carrying out the power calculation processing using the data obtained from the spread demodulation to the power calculating unit 23.

The displaying unit 30 shows the power values (the data measured for the respective measurement subject channels), which are calculated by the signal analyzing unit 20, on a screen in a predetermined format. The displaying unit 30 varies from one embodiment to another, and is described in the following respective embodiments.

First Embodiment

Figure 2:
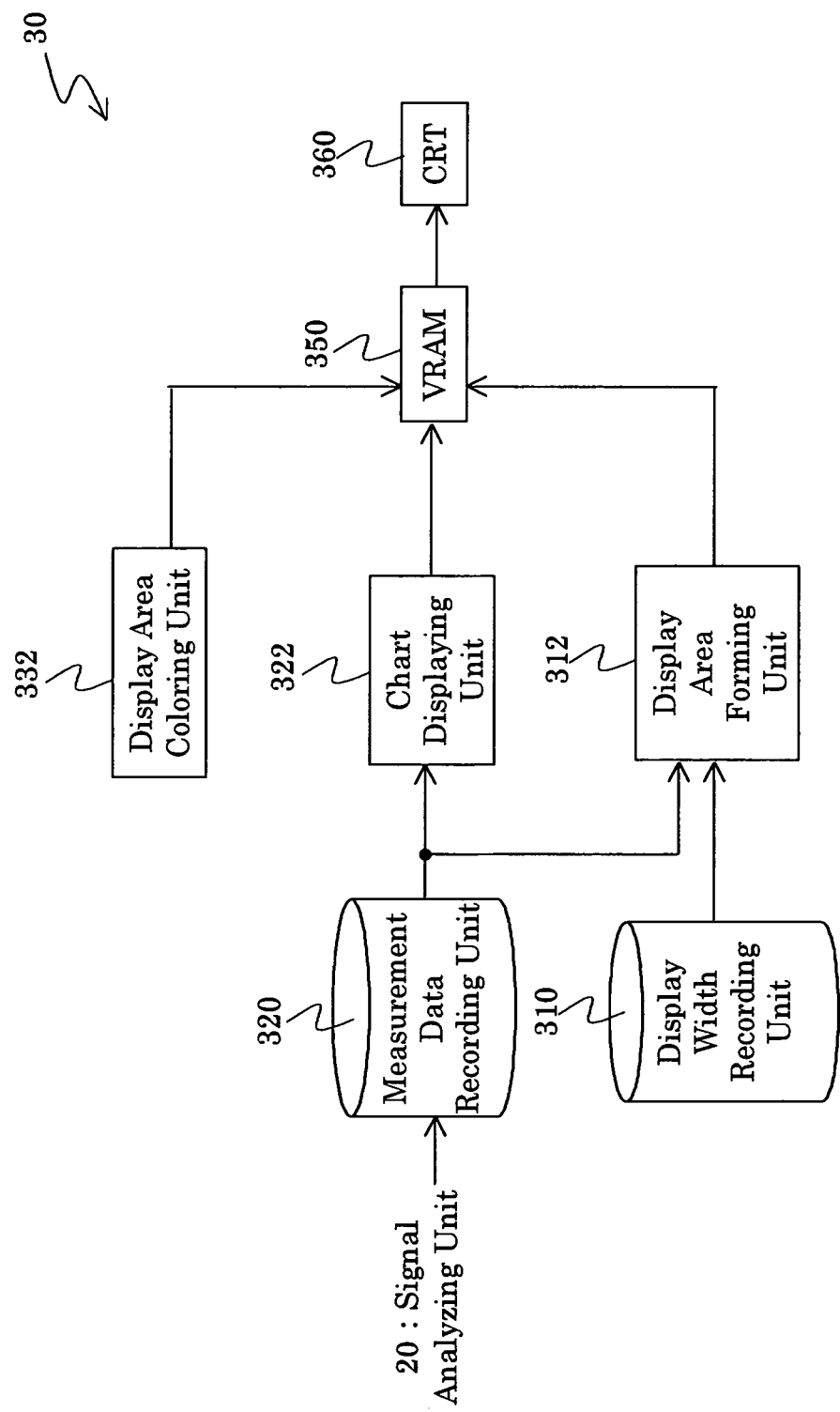
FIG. 2 is a block diagram showing a detailed constitution of a displaying unit 30 according to a first embodiment.

FIG. 2 is a block diagram showing a detailed constitution of a displaying unit 30 according to a first embodiment. As FIG. 2 shows, the displaying unit 30 includes a display width recording unit 310, a display area forming unit 312, a measurement data recording unit 320, a chart displaying unit 322, a display area coloring unit 332, a VRAM (Video Random Access Memory) 350, and a CRT (Cathode Ray Tube) 360.

Figure 4:
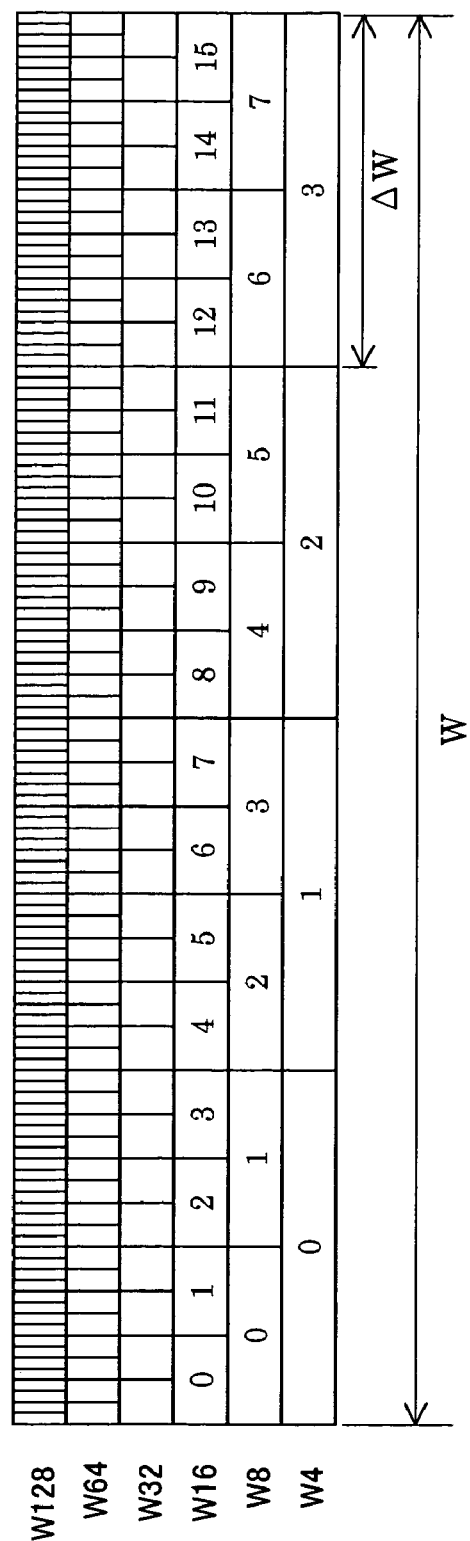
FIG. 4 shows a relationship between spreading code lengths and the widths of display areas.

The display width recording unit 310 records the widths of display areas. FIG. 3 shows what the display width recording unit 310 records. As FIG. 3 shows, a display form of the display area includes the width and the color which are determined by the spreading code length. Note that the widths of the display areas are recorded as moduli of the common overall width W regardless of the kind of the spreading code lengths. For example, when the spreading code length is 4, the width of the display area becomes (1/4) W. FIG. 4 shows the relationship between the spreading code lengths and the widths of the display areas. Note that W4, W8, . . . imply Walsh lengths 4, 8, . . . and numbers 0, 1, . . . in rows for the W4, W8, . . . , imply channel numbers. As FIG. 4 clearly shows, the width ΔW of the display area is (1/4) W when the spreading code length is 4, and the width ΔW of the display area is (1/8) W when the spreading code length is 8. The same applies to the spreading code lengths 16 and on.

Note that the spreading code length (Walsh length) for the cdma 2000 is 256 or less. Also, the embodiment of the present invention can be applied to W-CDMA, and the spreading code length (spreading factor) is 512 or less in this case. However, cases for the spreading code lengths 256 and 512 are not shown in FIG. 3 and subsequent drawings.

Figure 5:
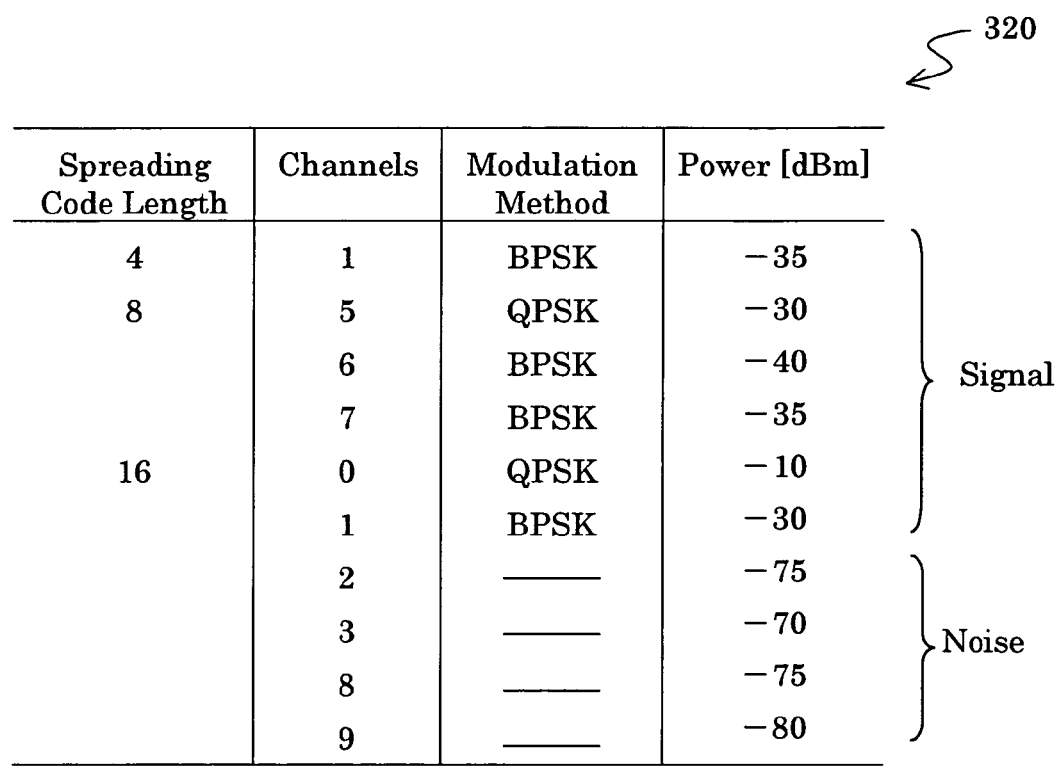
FIG. 5 shows what a measurement data recording unit 320 records.

The measurement data recording unit 320 receives the spreading code lengths, the measurement subject channels, the modulation methods, and the measurement data relating to the measurement subject channels (powers) from the signal analyzing unit 20, and records them. FIG. 5 shows what the measurement data recording unit 320 records. In an example shown in FIG. 5, the spreading code lengths, the measurement subject channels, the modulation methods, and the powers [dBm] corresponding to the measurement subject channels are recorded. For example, the power of the channel 1 of the spreading code length 4 is −35 [dBm], and the type of the modulation is the BPSK. Note that the power of a signal is large, and the power of a noise is small in general. Thus, it is determined whether a power is measured for a signal or a noise depending on whether the power is larger or smaller than a threshold. For example, when the threshold is −55 [dBm], a power equal to or less than −55 [dBm] is that of a noise, and a power exceeding −55 [dBm] is that of a signal. Note that a channel supplying a signal is referred to as an active channel, and a channel not supplying a signal but a noise is referred to as a non-active channel. In addition, the modulation method is not recorded for a noise. Further, the power of the noise is shown for the maxim spreading code length. In examples subsequent to FIG. 5, it is assumed that the maximum spreading code length is 16 for the sake of description. These noises are mixtures of noises from code layers of the various spreading code lengths. They do not show actual noises on the code layer of the maximum spreading code length.

The display area forming unit 312 forms display areas, and writes the areas on the VRAM 350. The display area has a position determined by its measurement subject channel and spreading code length, and has a width corresponding to its spreading code length. The measurement subject channel and the spreading code length are read out from the measurement data recording unit 320 (see FIG. 5), and the width is read out from the display width recording unit 310 (see FIGS. 3 and 4).

Figure 6:
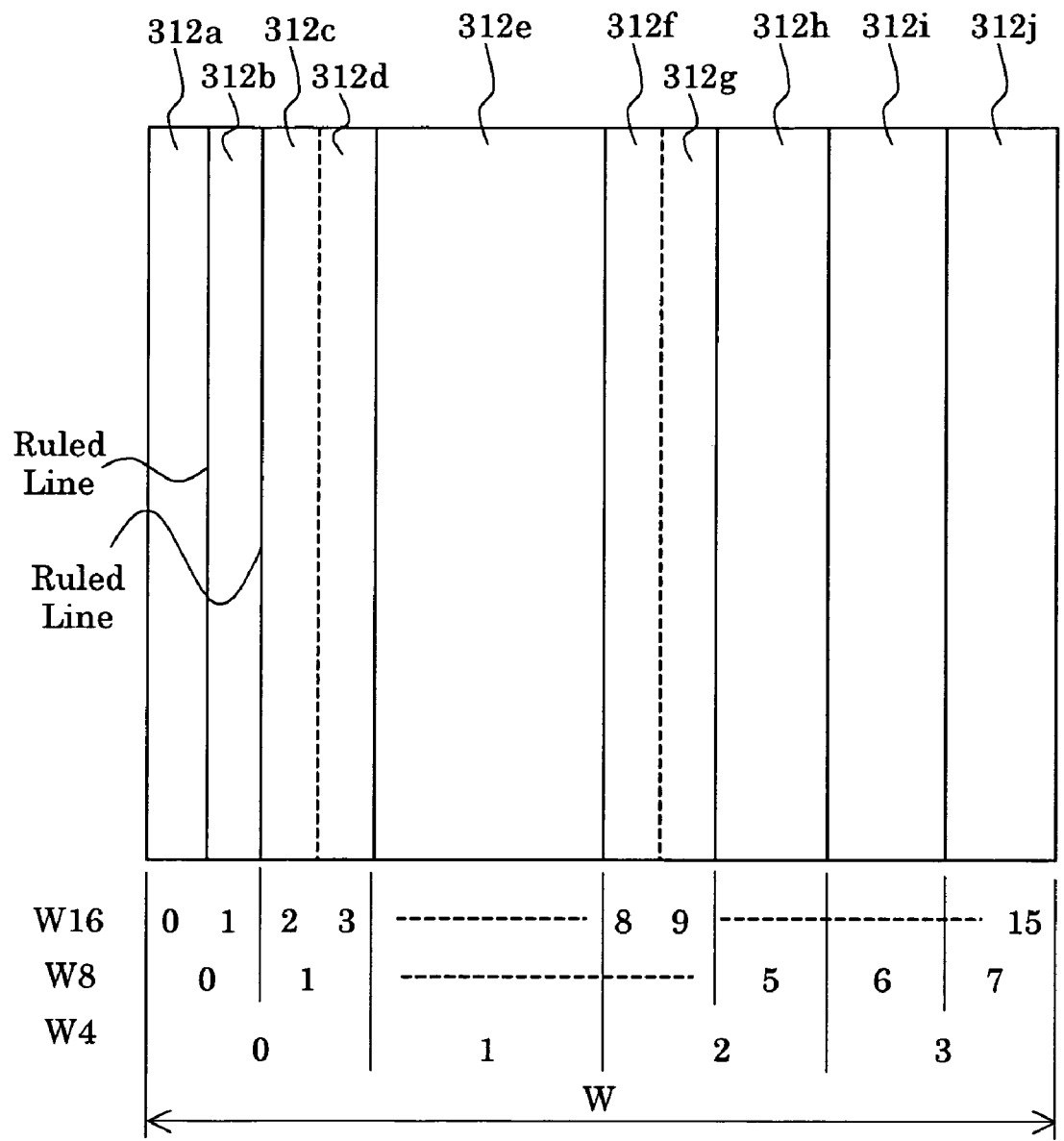
FIG. 6 shows a formation of the display areas.

Forming the display areas is described referring to FIG. 6. First, a display area 312a having a width of (1/16) W is formed at a position corresponding to the channel 0 of W16. Similarly, display areas 312b, 312c, and 312d having the width of (1/16) W are formed at positions corresponding to the channels 1 to 3 of the W16. Signals are present on the channels 0 and 1 of the W16 (see FIG. 5), and the display areas 312a and 312b correspond to these signals. Noises are present on the channels 2 and 3 of the W16 (see FIG. 5), and the display areas 312c and 312d correspond to these noises.

At this point, ruled lines spaced by the width of the display area are drawn for the display areas 312a and 312b corresponding to the signals. A ruled line is not drawn for the display area 312c corresponding to the noise. Note that a dotted line between the display areas 312c and 312d is not actually drawn, and is a virtual line. A channel 1 of the W4 follows the three channels of the W16, and a display area 312e with a width of (1/4) W is formed at a position corresponding to the channel 1 of the W4. Since the display area 312e corresponds to a signal (see FIG. 5), ruled lines spaced by the width of this display area are drawn. In this way, the display areas 312f to 312j are formed up to the last channel (corresponding to a channel 15 of the W16).

Figure 7:
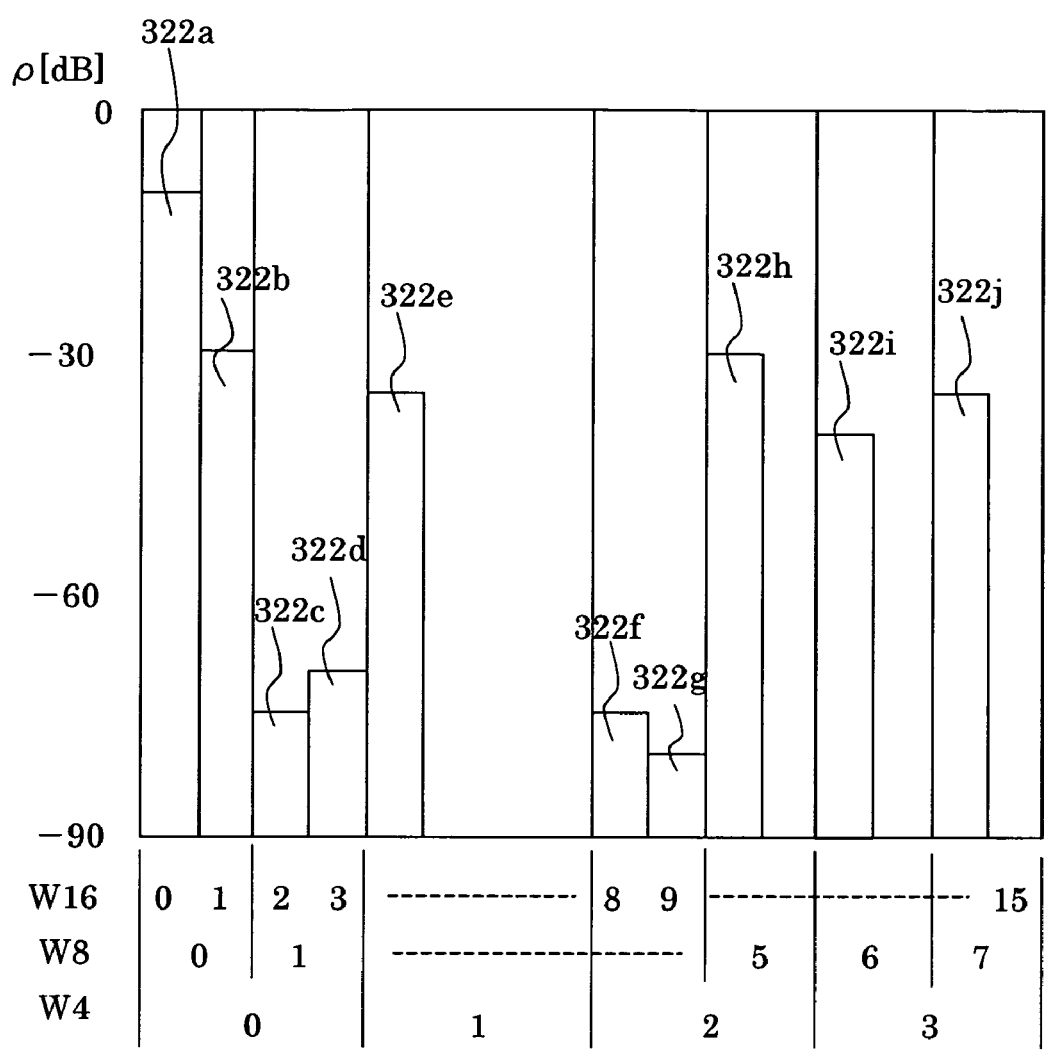
FIG. 7 is a display example for bar charts 322a to 322j.

The chart displaying unit 322 writes data for the bar charts 322a to 322j into the VRAM 350 so that the bar charts 322a to 322j with a constant width representing the measurement data are shown in the display areas 312a to 312j. FIG. 7 is a display example for the bar charts 322a to 322j. In the example shown in FIG. 7, it is assumed that the width is constant, and is (1/16) W corresponding to the W16. The bar charts 322a to 322j represent powers using their heights. Note that a screen shown in FIG. 7 may be presented on the CRT 360 without coloring the display areas by the display area coloring unit 332. In this case, the display area coloring unit 332 may be eliminated.

Figure 8:
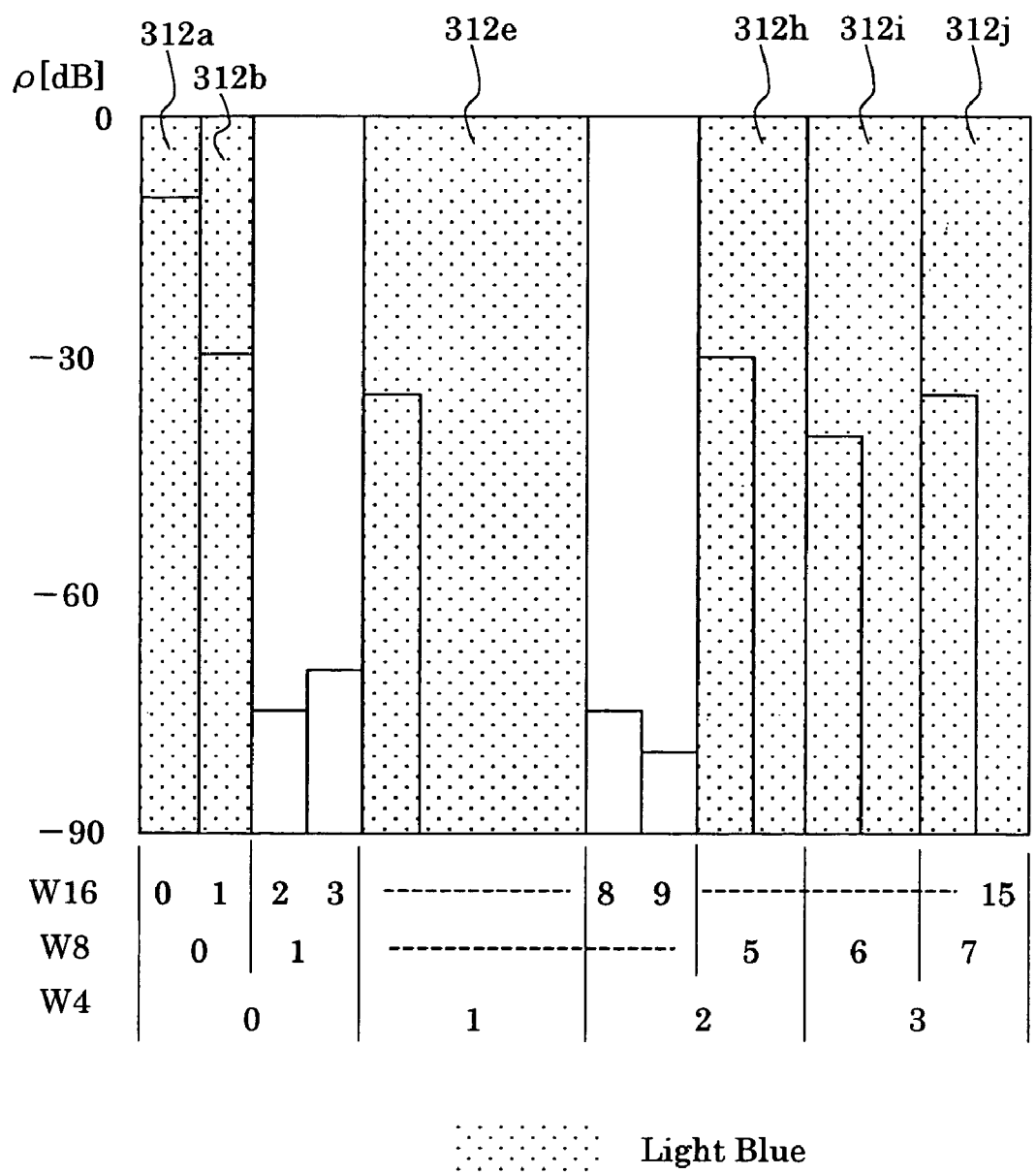
FIG. 8 shows a coloring example of the display areas.

The display area coloring unit 332 writes data for coloring into the VRAM 350 such that the display areas 312a to 312j are colored to a predetermined color tone depending on whether the measurement subject channel is active or not, namely, represents a signal or a noise. FIG. 8 shows a coloring example of the display areas. In the example in FIG. 8, the display areas 312a, 312b, 312e, 312h, 312i, and 312j whose measurement channel is active (supplying a signal) are colored in light blue. While the present embodiment is constituted such that the display areas are colored in light blue, it is possible to constitute such that the display areas 312a, 312b, 312e, 312h, 312i, and 312j may be changed to other display form such as a predetermined pattern.

Figure 9:
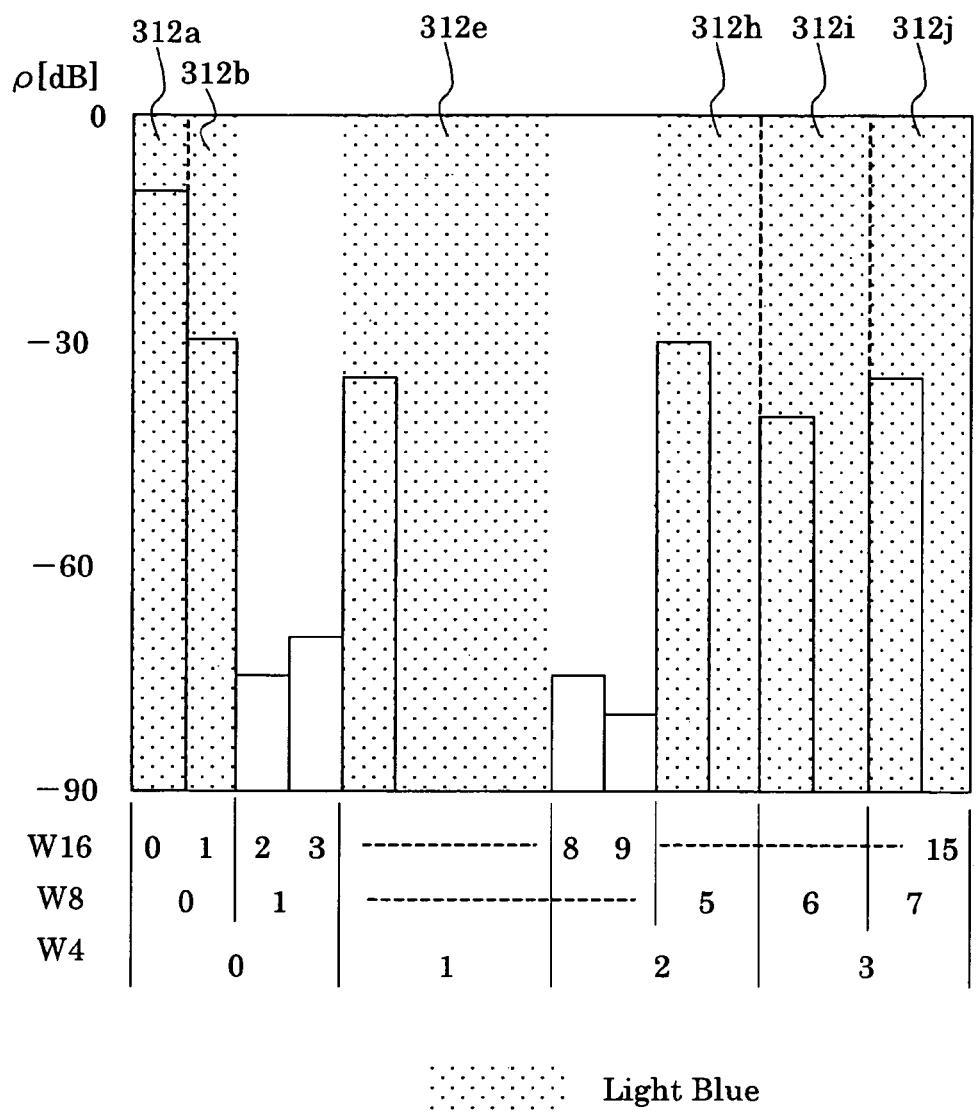
FIG. 9 shows a variation of the coloring example of the display areas.

Note that ruled lines may not be drawn as shown in FIG. 9 as a variation. Namely, the display area forming unit 312 does not draw ruled lines at all whether a signal is present or not. Note that a dotted line between the display areas 312a and 312b, a dotted line between the display areas 312h and 312i, and a dotted line between the display areas 312i and 312j are virtual, and not actually present.

In addition, the display area coloring unit 332 may not color display areas with the narrowest width whether the measurement subject channel is active or not, namely, represents a signal or a noise, as a further variation.

Figure 10:
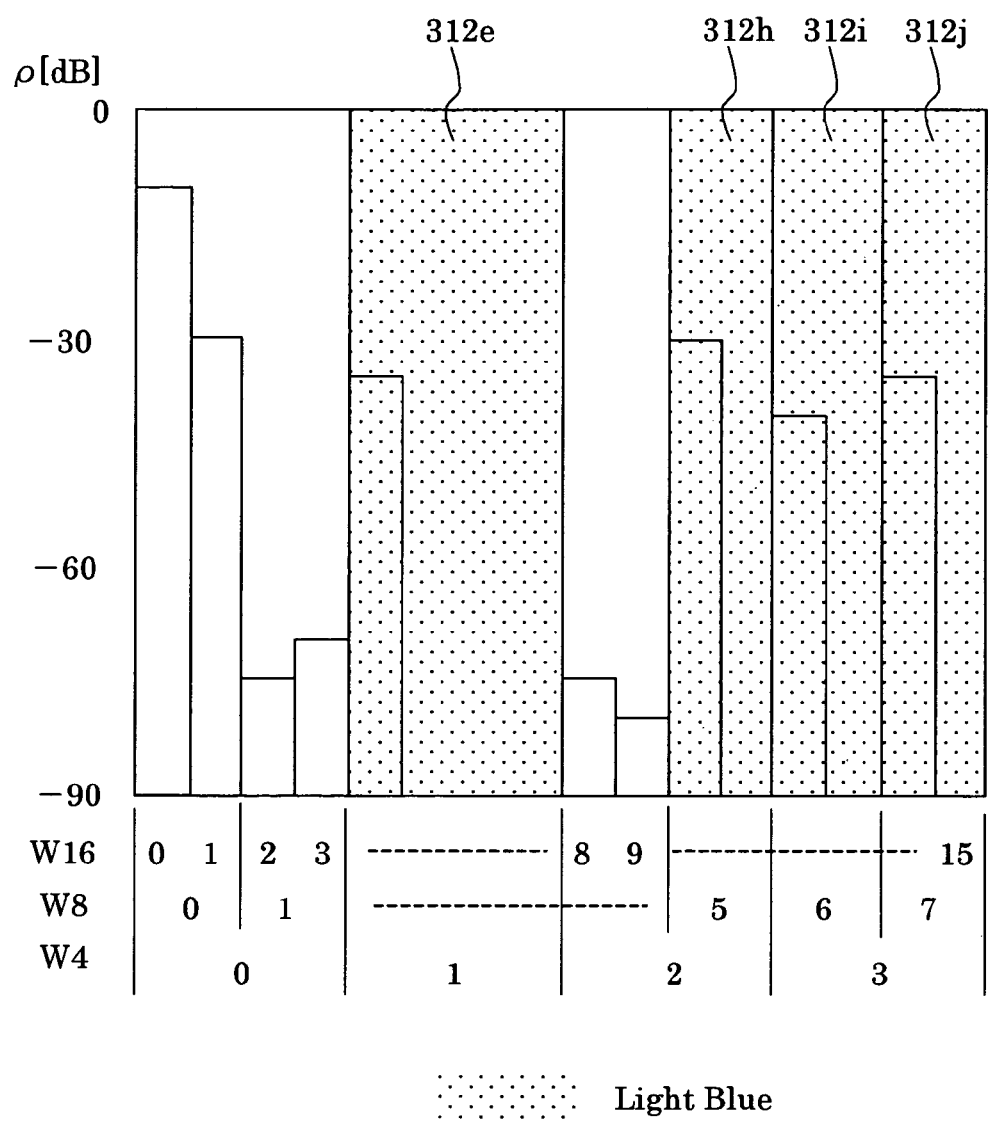
FIG. 10 shows a variation of the coloring example of the display areas.
Figure 11:
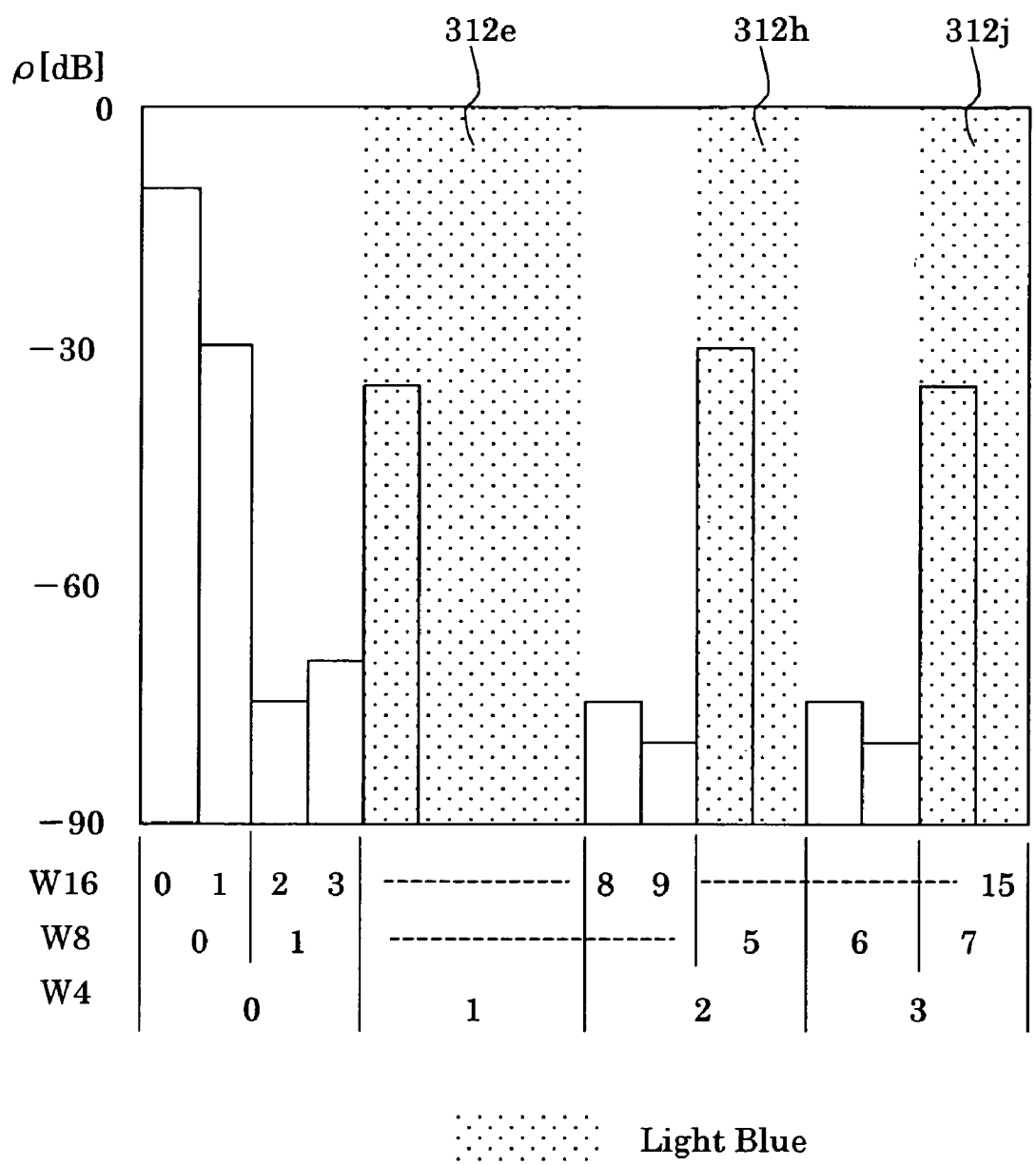
FIG. 11 shows a variation of the coloring example of the display areas.

FIG. 10 shows a variation which does not color the display areas with the narrowest width. The display areas 312a and 312b are not colored though the signals are present. Note that the display area forming unit 312 may draw no ruled lines whether a signal is present or not in this case too. Its example is shown in FIG. 11. In FIG. 11, for the sake of illustration, it is assumed that an area corresponding to the channel 6 of the W8 indicates the presence of a noise.

The VRAM 350 records the data output from the display area forming unit 312, the chart displaying unit 322, and the display area coloring unit 332. The CRT 360 reads out these data from the VRAM 350 and displays them. Screens displayed on the CRT 360 correspond to what FIGS. 7 to 11 show.

Figure 12:
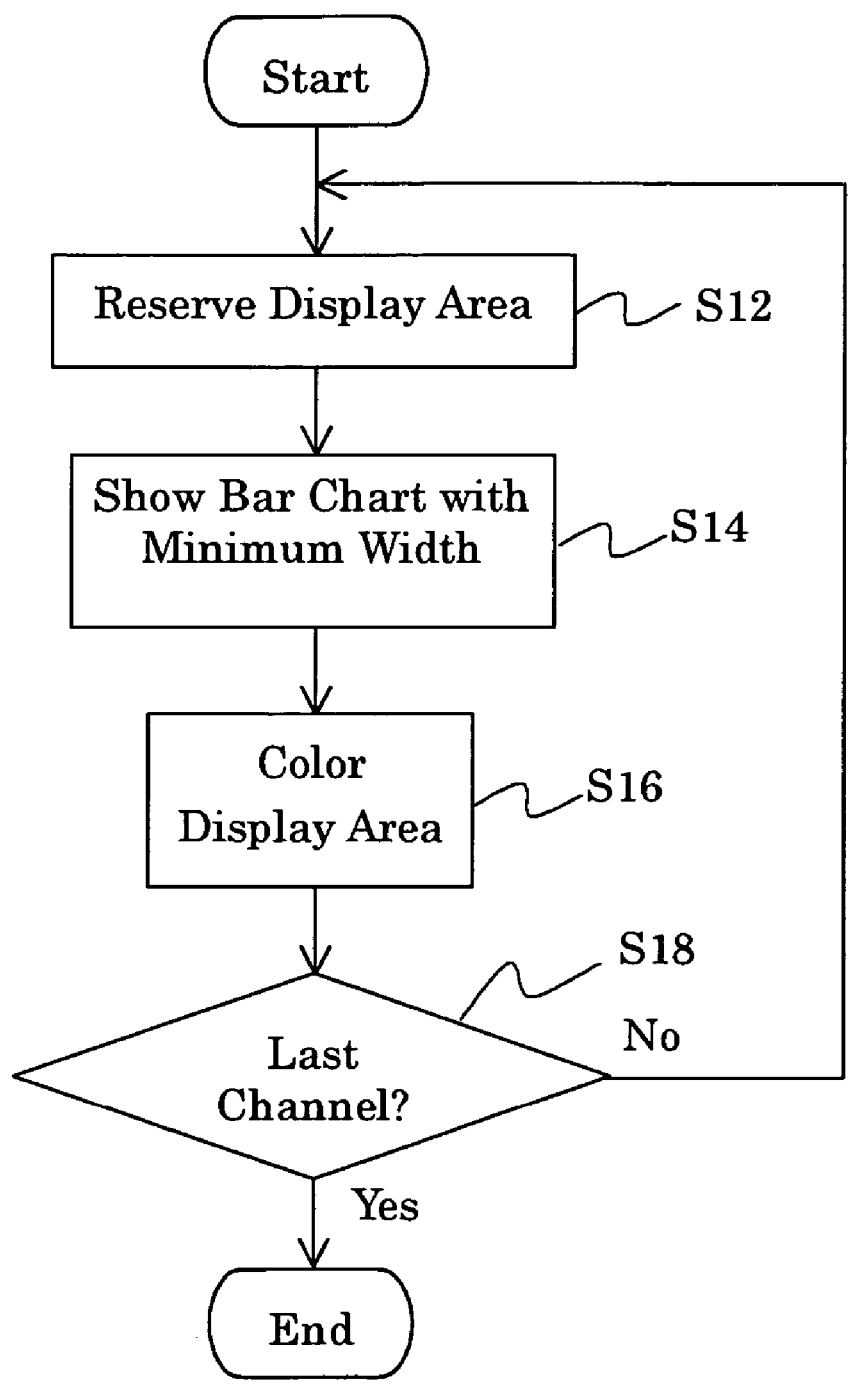
FIG. 12 is a flowchart showing an operation of the first embodiment.

Now, description is given of the operation of the first embodiment referring to a flowchart shown in FIG. 12. First, the mixer 12 mixes the RF signal with the local signal to provide the IF signal. The IF signal undergoes the band limiting by the band-pass filter 14, is converted into the digital data by the A/D converter 16, and is input to the signal analyzing unit 20.

The data input to the signal analyzing unit 20 is demodulated by the spread demodulating unit 21, the power calculating unit 23 calculates powers on the respective measurement subject channels based on the demodulated data, and outputs the powers along with the spreading code lengths and the measurement subject channels to the measurement data recording unit 320 of the displaying unit 30. Note that the spreading codes used by the spread demodulating unit 21 are generated by the spreading code generating unit 22.

The display area forming unit 312 reads out the measurement data from the measurement data recording unit 320, and reserves (forms) display areas 312a to 312j based on what the display width recording unit 310 records (see FIG. 6) (S12). Then, the chart displaying unit 322 shows bar charts 322a to 322j with the width corresponding to the spreading code length 16 (minimum length) in the reserved display areas 312a to 312j (see FIG. 7) (S14). Then, the display area coloring unit 332 colors the display areas 312a to 312j (see FIGS. 8 to 11) (S16). Then, the chart displaying unit 322 determines whether up to the last channels are shown or not (S18), and returns to the step for reserving the display area (S12) if up to the last channels are not shown (S18: No). If the up to last channels are shown (S18: Yes), the operation terminates.

According to the first embodiment, since the display areas 312a to 312j have widths corresponding to the spreading code lengths, and are colored, even when measurement data such as code domain powers on a plurality of kinds of code layers are simultaneously shown, it is possible to tell to which code layer the code domain power and the like belong.

Second Embodiment

A second embodiment is different from the first embodiment in that the color tone of the display areas 312a to 312j is changed according to the respective modulation methods.

Figure 13:
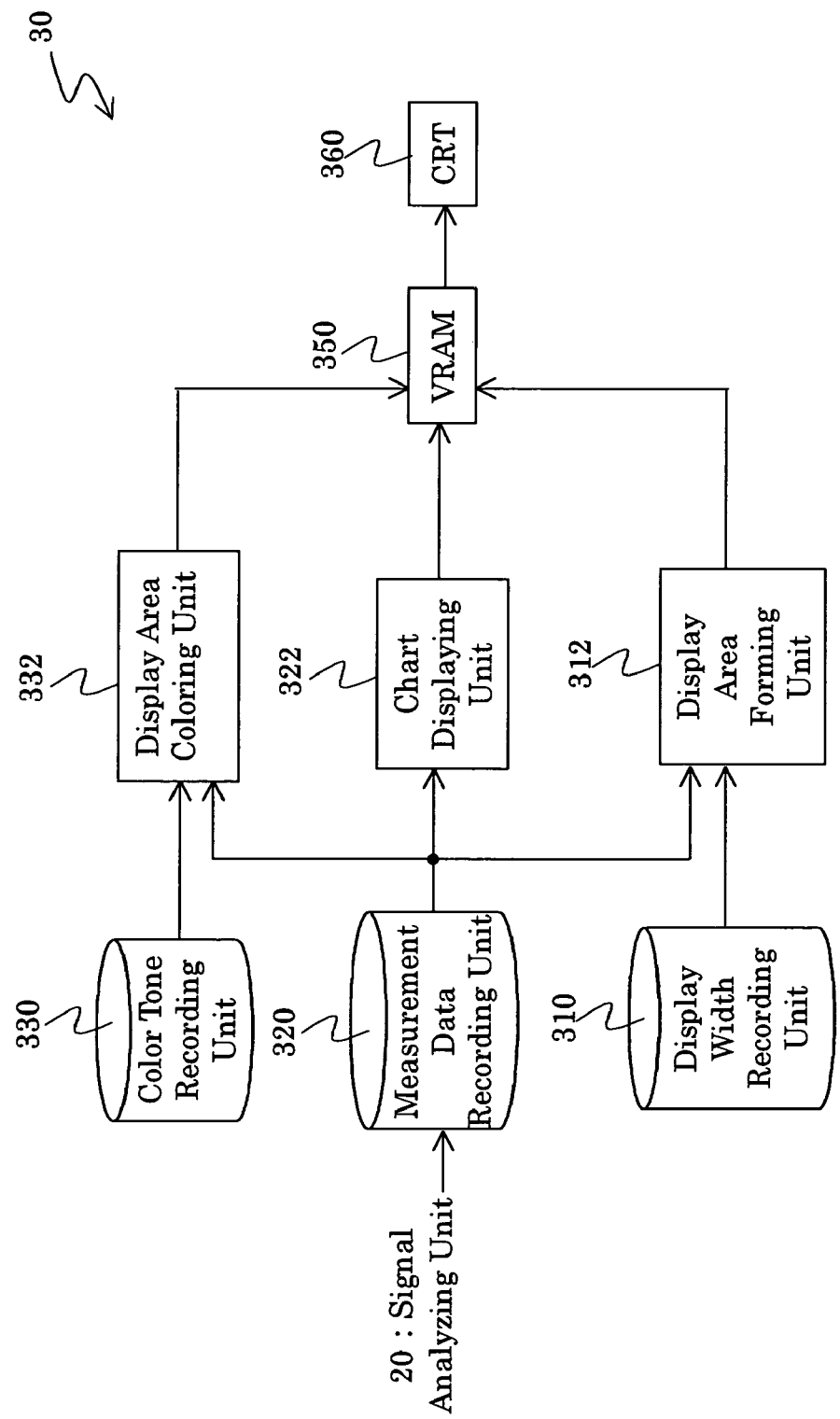
FIG. 13 is a block diagram showing a detailed constitution of the displaying unit 30 according to a second embodiment.

FIG. 13 is a block diagram showing a detailed constitution of the displaying unit 30 according to the second embodiment. As shown in FIG. 13, the displaying unit 30 includes the display width recording unit 310, the display area forming unit 312, the measurement data recording unit 320, the chart displaying unit 322, a color tone recording unit 330, the display area coloring unit 332, the VRAM (Video Random Access Memory) 350, and the CRT (Cathode Ray Tube) 360. In the following section, the same numerals are assigned to parts similar to those in the first embodiment, and description for them is not provided.

The display width recording unit 310, the display area forming unit 312, the measurement data recording unit 320, the chart displaying unit 322, the VRAM (Video Random Access Memory) 350, and the CRT (Cathode Ray Tube) 360 are similar to those in the first embodiment.

Figure 14:
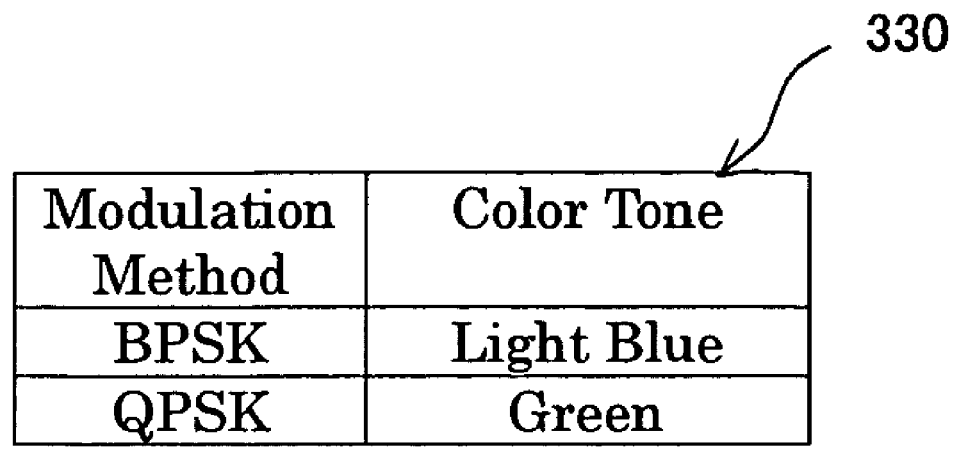
FIG. 14 shows an example of what a color tone recording unit 330 records.

The color tone recording unit 330 records color tones corresponding to the modulation methods relating to the measurement subject channels. FIG. 14 shows an example of what the color tone recording unit 330 records. If the modulation method is the BPSK, a display area is colored in light blue, and if the modulation method is the QPSK, a display area is colored in green.

Figure 15:
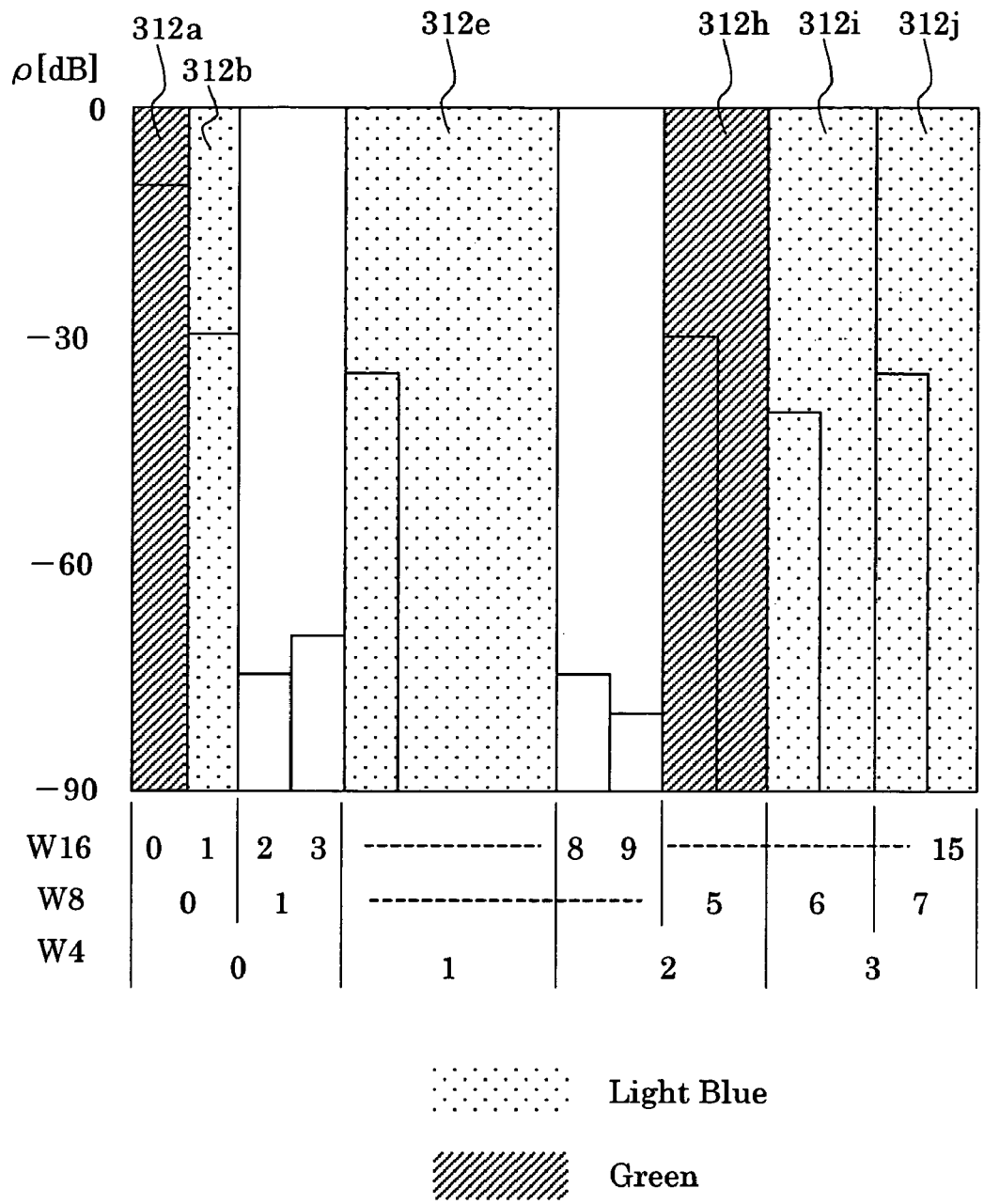
FIG. 15 shows a coloring example of the display areas.

The display area coloring unit 332 colors the display areas 312a to 312j in the color tones recorded in the color tone recording unit 330. FIG. 15 shows a coloring example. Since the display area 312a corresponds to the spreading code length of 16 and the channel 0, and has the modulation method of the QPSK (see FIG. 5), this display area is colored in green. Since the display area 312b corresponds to the spreading code length of 16 and the channel 1, and has the modulation method of the BPSK (see FIG. 5), this display area is colored in light blue. Other display areas are colored in the same manner. Note that the method of modulation is not recorded for the areas where a noise is present (see FIG. 5), and these areas are not colored. Therefore, colored display areas are only 312a, 312b, 312e, 312h, 312i, and 312j where a signal is present.

Note that the operation of the second embodiment is similar to that of the first embodiment.

According to the second embodiment, the methods of the modulation of the respective channels are shown in addition to the effects provided by the first embodiment.

Third Embodiment

A third embodiment is different from the second embodiment in that the color tone of auxiliary display areas 314a to 314j is changed according to the respective modulation methods.

Figure 16:
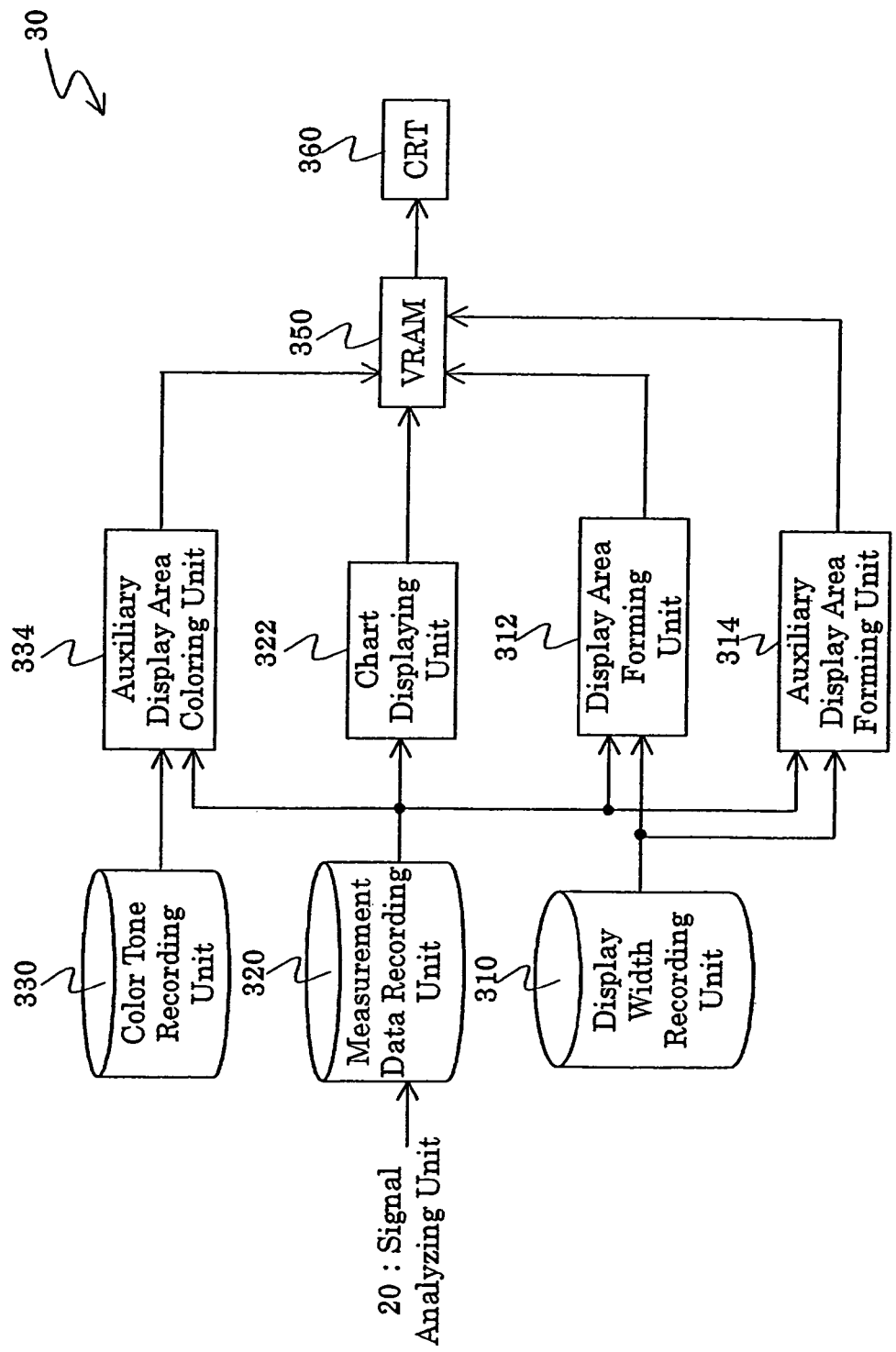
FIG. 16 is a block diagram showing a detailed constitution of the displaying unit 30 according to a third embodiment.

FIG. 16 is a block diagram showing a detailed constitution of the displaying unit 30 according to the third embodiment. As shown in FIG. 16, the displaying unit 30 includes the display width recording unit 310, the display area forming unit 312, an auxiliary display area forming unit 314, the measurement data recording unit 320, the chart displaying unit 322, the color tone recording unit 330, an auxiliary display area coloring unit 334, the VRAM (Video Random Access Memory) 350, and the CRT (Cathode Ray Tube) 360. In the following section, the same numerals are assigned to parts similar to those in the second embodiment, and description for them is not provided.

The display width recording unit 310, the display area forming unit 312, the measurement data recording unit 320, the chart displaying unit 322, the color tone recording unit 330, the VRAM (Video Random Access Memory) 350, and the CRT (Cathode Ray Tube) 360 are similar to those in the second embodiment.

The display area forming unit 314 forms auxiliary display areas and writes the areas on the VRAM 350. The auxiliary display areas are displaced at the bottom of the display areas, and have a predetermined height.

Figure 17:
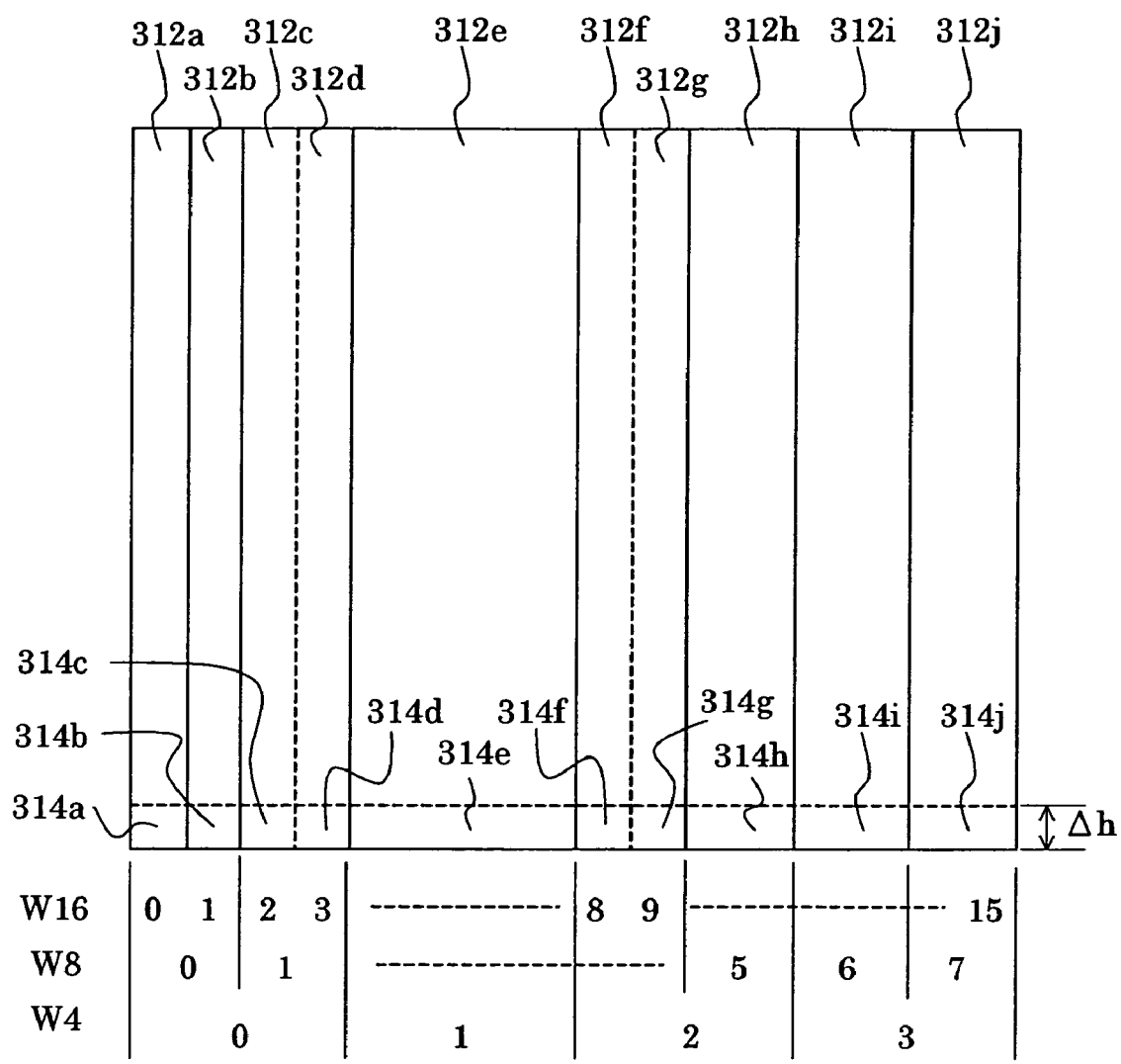
FIG. 17 shows a formation of auxiliary display areas.

Forming the auxiliary display areas is described referring to FIG. 17. First, an auxiliary display area 314a is formed at the bottom of the display area 312a. Similarly, auxiliary display areas 314b, . . . , 314j are formed at the bottom of the display areas 312b, . . . , 312j. Note that any one of the auxiliary display areas 314a, 314b, . . . , 314j has a common height Δh.

Figure 18:
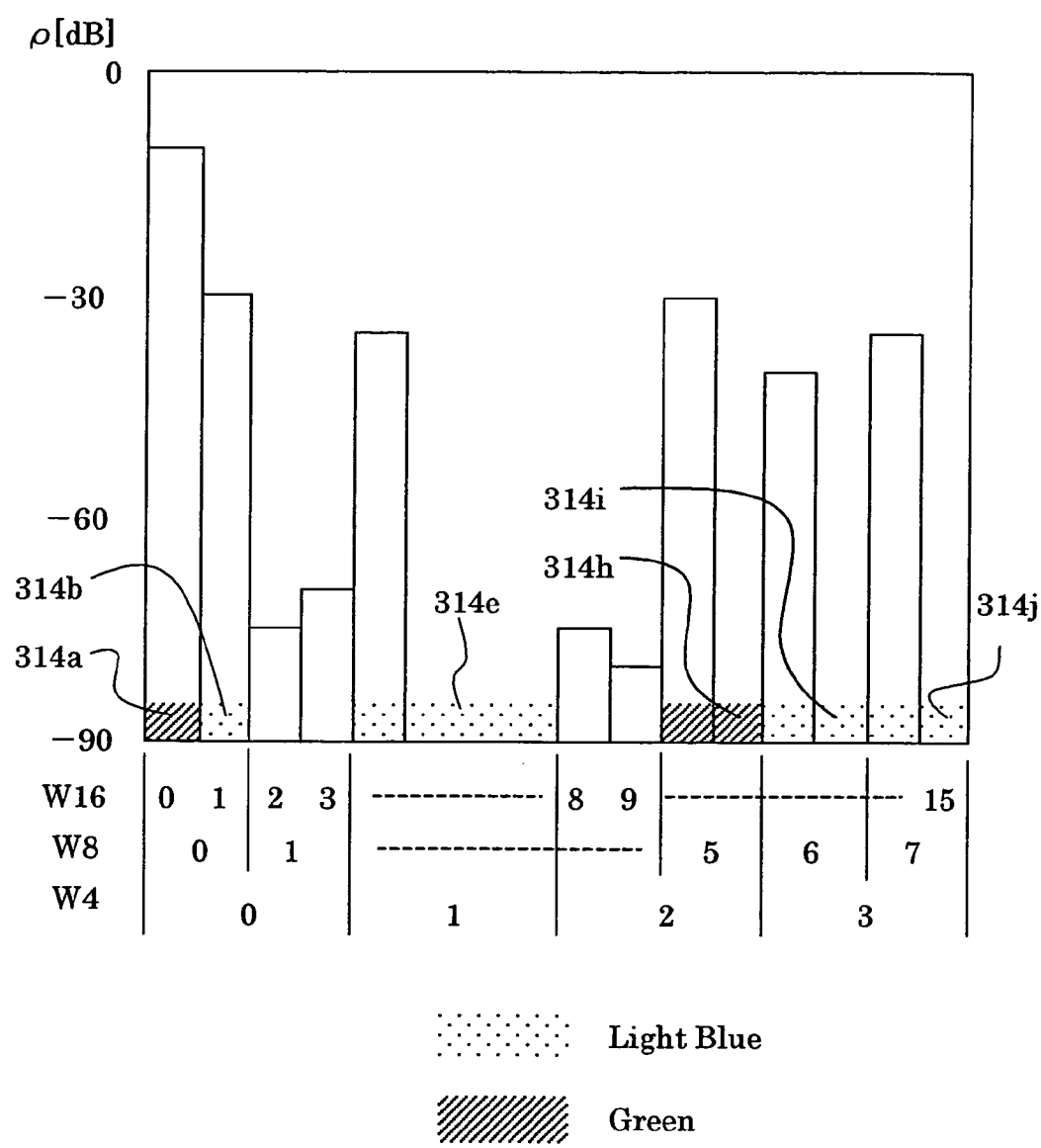
FIG. 18 shows a coloring example of the auxiliary display areas.

The auxiliary display area coloring unit 334 colors the auxiliary display areas 314a to 314j in color tones recorded in the auxiliary color tone recording unit 334. FIG. 18 shows a coloring example. Since the auxiliary display area 314a corresponds to the spreading code length of 16 and the channel 0, and has the modulation method of the QPSK (see FIG. 5), this auxiliary display area is colored in green. Since the auxiliary display area 314b corresponds to the spreading code length of 16 and the channel 1, and has the modulation method of the BPSK (see FIG. 5), this display area is colored in light blue. Other display areas are colored in the same manner. Note that the method of modulation is not recorded for the areas where a noise is present (see FIG. 5), and these areas are not colored. Therefore, colored auxiliary display areas are only 314a, 314b, 314e, 314h, 314i, and 314j where a signal is present.

While the present embodiment is constituted such that the auxiliary display areas are colored in light blue, it is possible to constitute such that the auxiliary display areas 314a, 314b, 314e, 314h, 314i, and 314j may be changed to other display form such as a predetermined pattern.

Figure 19:
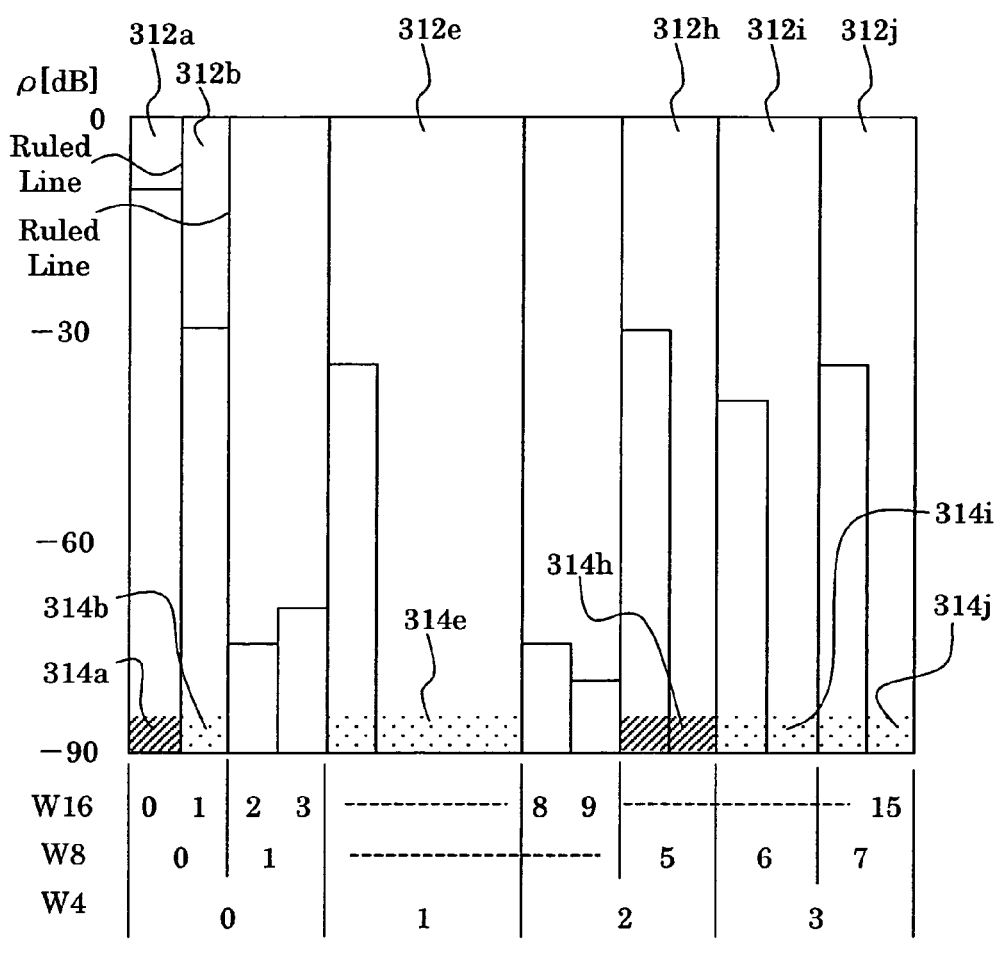
FIG. 19 shows a variation of the coloring example of the auxiliary display areas.
Figure 20:
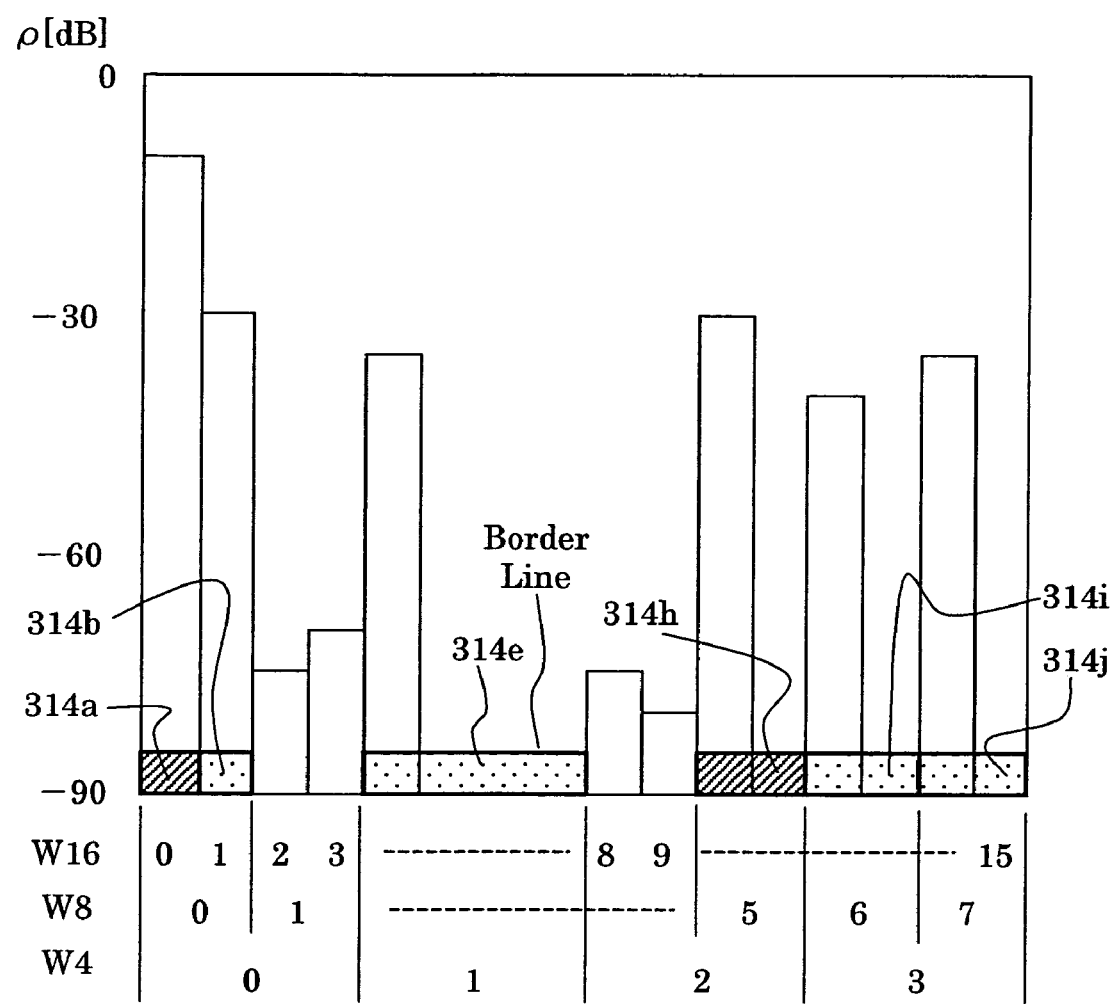
FIG. 20 shows a variation of the coloring example of the auxiliary display areas.

Note that the display area forming unit 312 may draw ruled lines with an interval spaced by the widths of the display areas 312a, 312b, 312e, 312h, 312i, and 312j corresponding to the signals as a variation as shown in FIG. 19. The auxiliary display area forming unit 314 may draw lines at borders (referred to as border lines) of the auxiliary display areas 314a, 314b, 314e, 314h, 314i, and 314j corresponding to the signals as a still further variation as shown in FIG. 20. In FIG. 20, the border lines include a thick line around the auxiliary display area 314a. Note that the border lines may be colored, and may be colored in orange for example.

Figure 21:
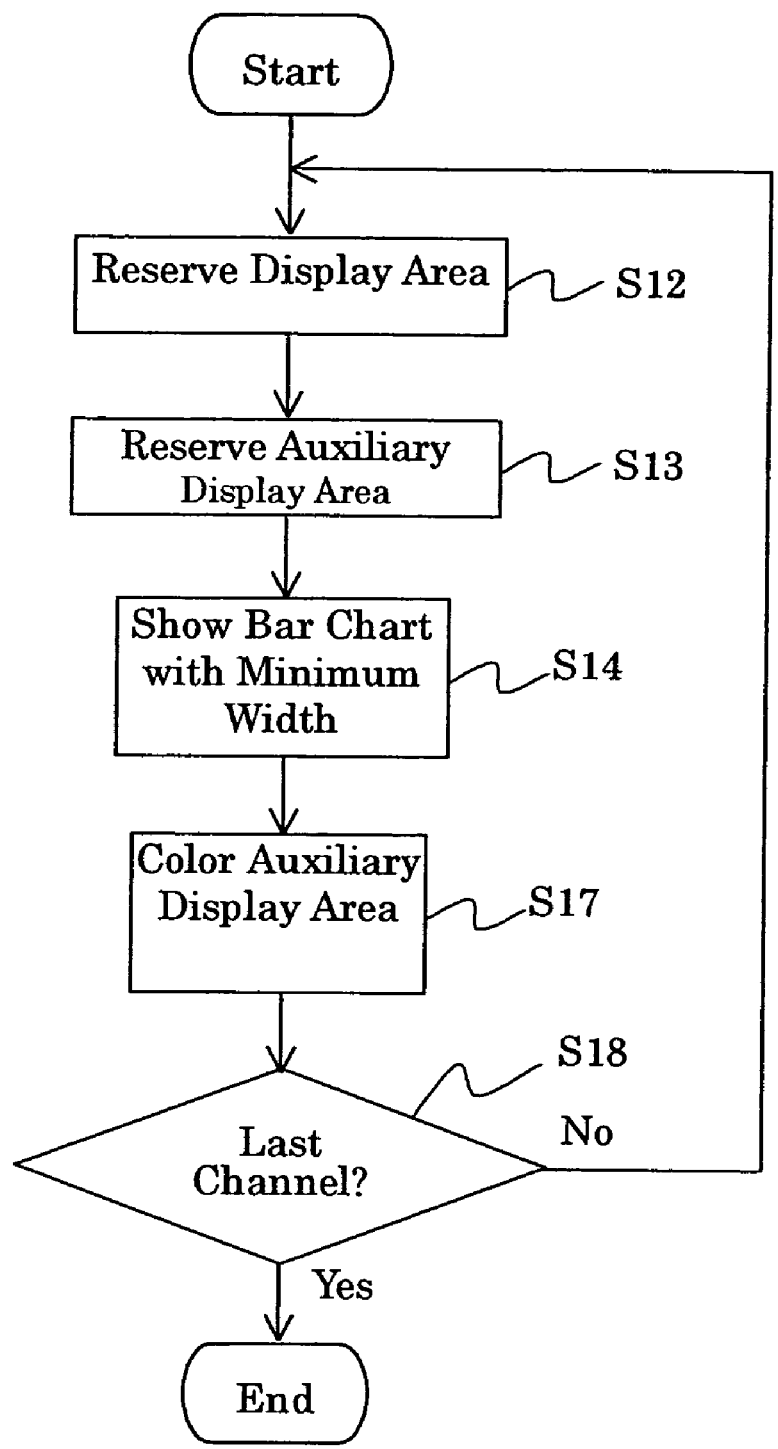
FIG. 21 is a flowchart showing an operation of the third embodiment.

Now, description is given of the operation of the third embodiment referring to a flowchart shown in FIG. 21. First, the mixer 12 mixes the RF signal with the local signal to provide the IF signal. The IF signal undergoes the band limiting by the band-pass filter 14, is converted into the digital data by the A/D converter 16, and is input to the signal analyzing unit 20.

The data input to the signal analyzing unit 20 is demodulated by the spread demodulating unit 21, the power calculating unit 23 calculates powers on the respective measurement subject channels based on the demodulated data, and outputs the powers along with the spreading code lengths and the measurement subject channels to the measurement data recording unit 320 of the displaying unit 30. Note that the spreading codes used by the spread demodulating unit 21 are generated by the spreading code generating unit 22.

The display area forming unit 312 reads out the measurement data from the measurement data recording unit 320, and reserves (forms) display areas 312a to 312j based on what the display width recording unit 310 records (see FIG. 6) (S12). Then, the auxiliary display area forming unit 312 reserves (forms) the auxiliary display areas 314a to 314j (see FIG. 17) (S13). Then, the chart displaying unit 322 shows the bar charts 322a to 322j with the width corresponding to the spreading code length 16 (minimum length) in the reserved display areas 312a to 312j (see FIG. 7) (S14). Then, the auxiliary display area coloring unit 334 colors the auxiliary display areas 314a to 314j (see FIGS. 18 to 20) (S17). Then, the chart displaying unit 322 determines whether up to the last channels are shown or not (S18), and returns to the step for reserving the display area (S12) if up to the last channels are not shown (S18: No). If up to the last channels are shown (S18: Yes), the operation terminates.

According to the third embodiment, since the auxiliary display areas 314a to 314j are disposed at the bottom of the display areas, they have the widths corresponding to the spreading code lengths. Additionally, the auxiliary display area coloring unit 334 colors them. Thus, even when measurement data such as code domain powers on a plurality of kinds of code layers are simultaneously shown, it is possible to tell to which code layer the code domain power and the like belong. Further, the color tones of the auxiliary display areas indicate the modulation methods of the respective channels.

Fourth Embodiment

The fourth embodiment is different from the third embodiment.

Figure 22:
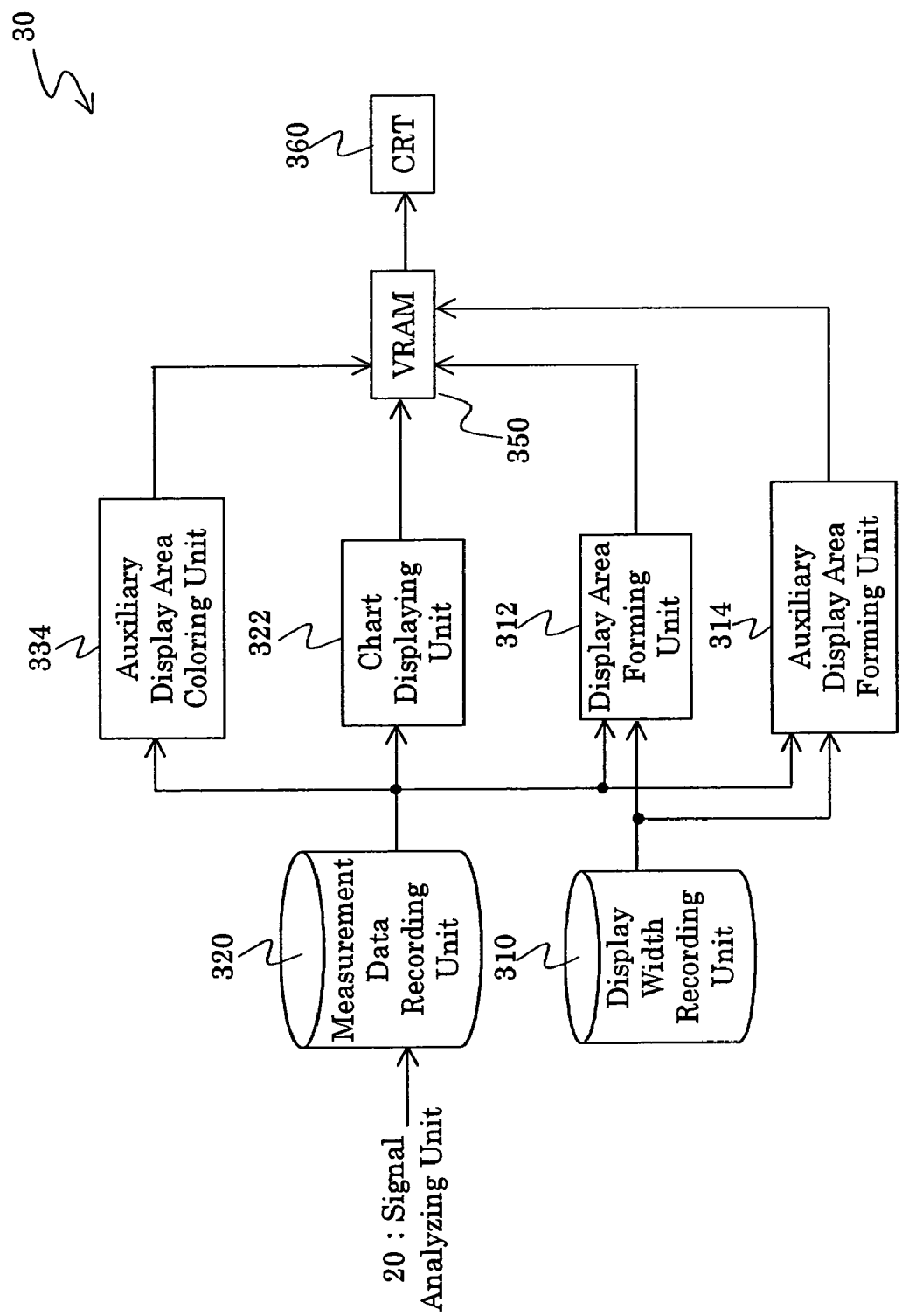
FIG. 22 is a block diagram showing a detailed constitution of the displaying unit 30 according to a fourth embodiment.

FIG. 22 is a block diagram showing a detailed constitution of the displaying unit 30 according to the fourth embodiment. As shown in FIG. 22, the displaying unit 30 includes the display width recording unit 310, the display area forming unit 312, the auxiliary display area forming unit 314, the measurement data recording unit 320, the chart displaying unit 322, the auxiliary display area coloring unit 334, the VRAM (Video Random Access Memory) 350, and the CRT (Cathode Ray Tube) 360. In the following section, the same numerals are assigned to parts similar to those in the third embodiment, and description for them is not provided.

The display width recording unit 310, the display area forming unit 312, the measurement data recording unit 320, the chart displaying unit 322, the VRAM (Video Random Access Memory) 350, and the CRT (Cathode Ray Tube) 360 are similar to those in the third embodiment.

The auxiliary display area forming unit 314 is almost similar to that of the third embodiment. However, a characteristic of the fourth embodiment is that the height of the auxiliary display areas represents a threshold (such as −55 [dBm]) discriminating between a signal and a noise.

Figure 23:
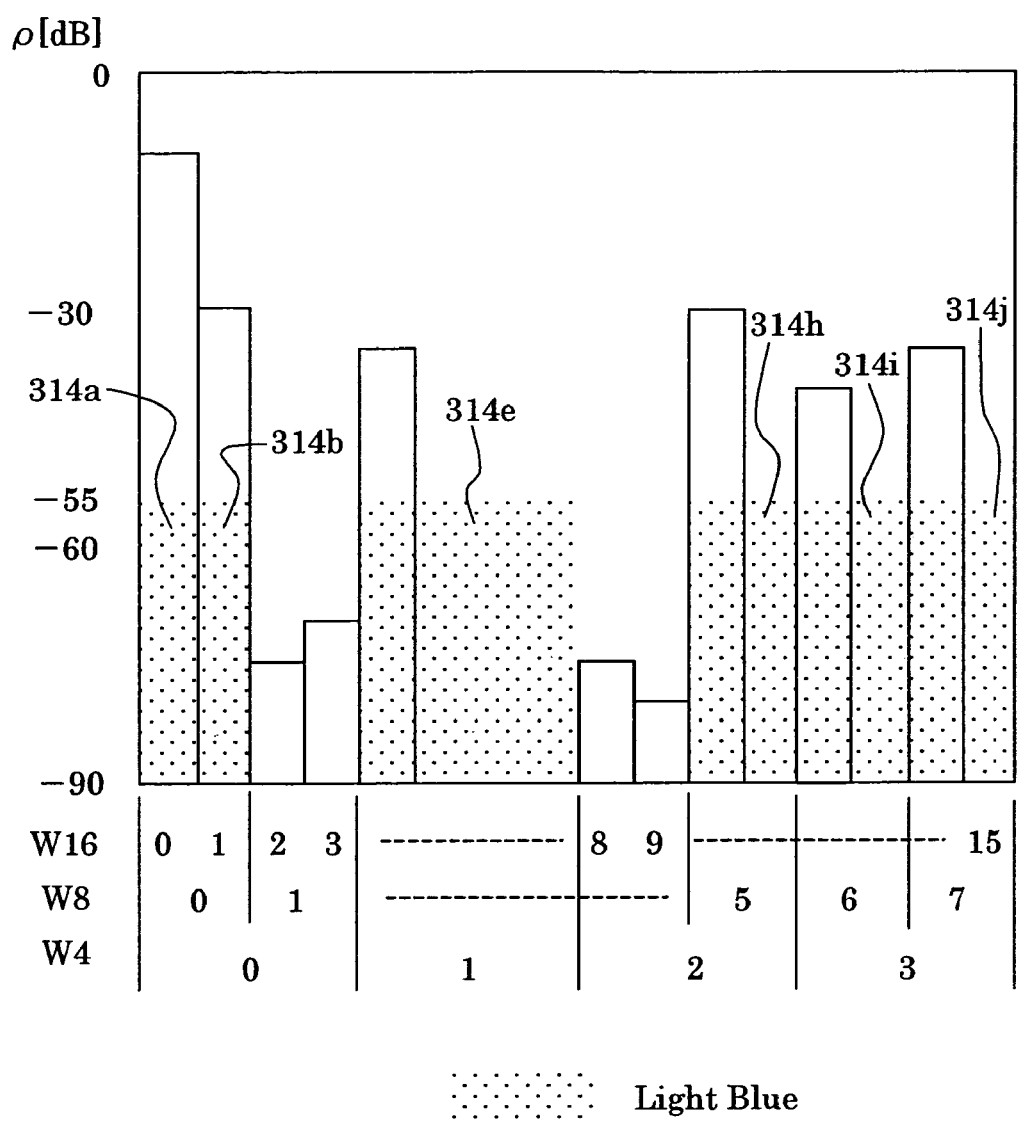
FIG. 23 shows a coloring example of the auxiliary display areas.

The auxiliary display area coloring unit 334 colors the auxiliary display areas 314a to 314j in predetermined color tones according to whether the measurement subject channel is active or not, namely represents a signal or a noise. FIG. 23 shows a coloring example. In the example in FIG. 23, the auxiliary display areas 312a, 312b, 312e, 312h, 312i, and 312j whose measurement subject channel is active (supplying a signal) are colored in light blue. Further, the height of the auxiliary display areas 312a, 312b, 312e, 312h, 312i, and 312j corresponds to the threshold −55 [dBm] for discriminating between a signal and a noise.

Note that the operation of the fourth embodiment is similar to that of the third embodiment.

According to the fourth embodiment, since the auxiliary display areas 314a to 314j are disposed at the bottom of the display areas, they have the widths corresponding to the spreading code lengths. Additionally, the auxiliary display area coloring unit 334 colors them. Thus, even when measurement data such as code domain powers on a plurality of kinds of code layers are simultaneously shown, it is possible to tell to which code layer the code domain power and the like belong. Further, the height of the auxiliary display areas 314a to 314j indicates the threshold discriminating between a signal and a noise.

Fifth Embodiment

A fifth embodiment is different from the third embodiment in that the bar charts 322a to 322j are colored.

Figure 24:
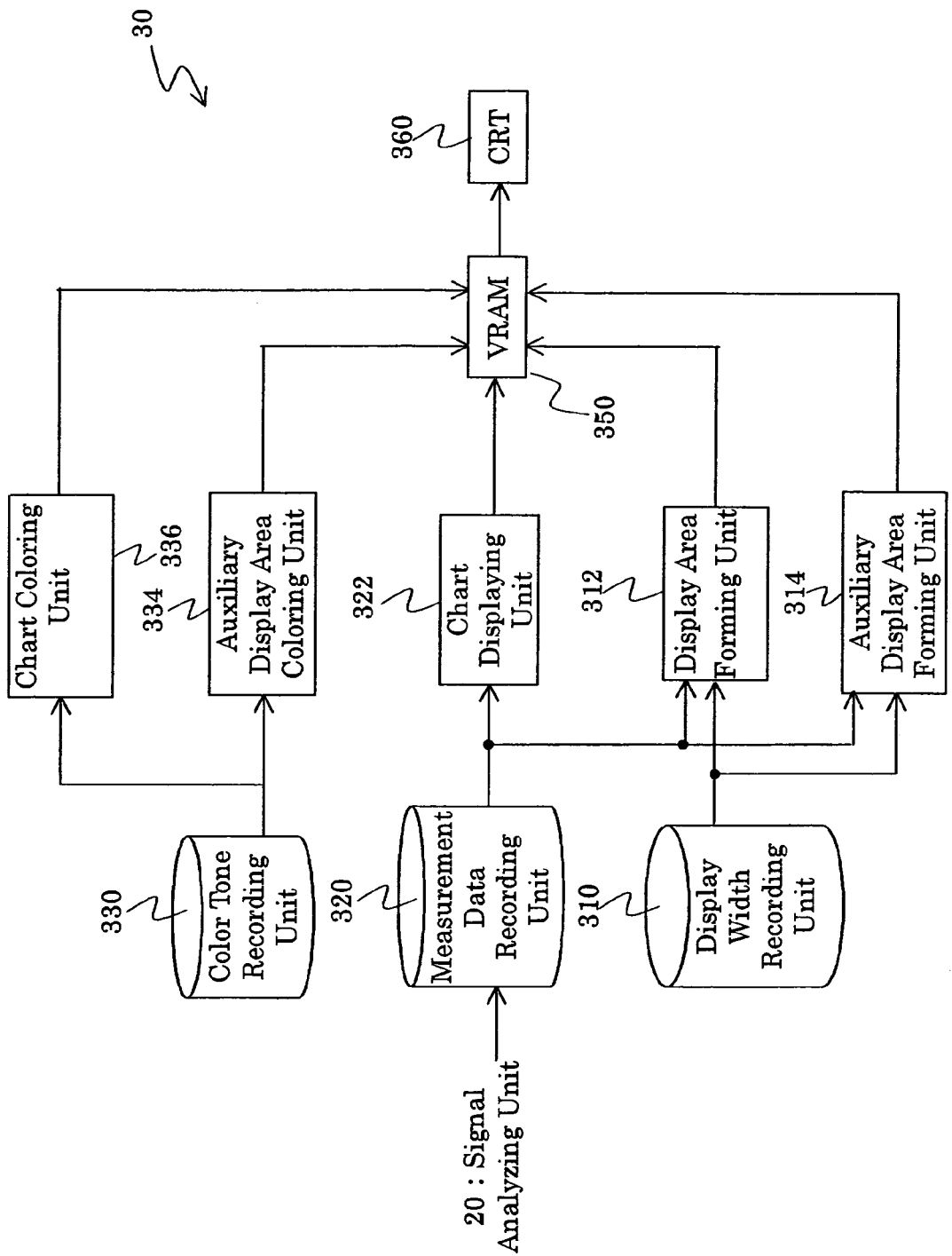
FIG. 24 is a block diagram showing a detailed constitution of the displaying unit 30 according to a fifth embodiment.

FIG. 24 is a block diagram showing a detailed constitution of the displaying unit 30 according to the fifth embodiment. As shown in FIG. 24, the displaying unit 30 includes the display width recording unit 310, the display area forming unit 312, the auxiliary display area forming unit 314, the measurement data recording unit 320, the chart displaying unit 322, the color tone recording unit 330, the auxiliary display area coloring unit 334, a chart coloring unit 336, the VRAM (Video Random Access Memory) 350, and the CRT (Cathode Ray Tube) 360. In the following section, the same numerals are assigned to parts similar to those in the third embodiment, and description for them is not provided.

The display width recording unit 310, the display area forming unit 312, the auxiliary display area forming unit 314, the measurement data recording unit 320, the chart displaying unit 322, the color tone recording unit 330, the auxiliary display area coloring unit 334, the VRAM (Video Random Access Memory) 350, and the CRT (Cathode Ray Tube) 360 are similar to those in the third embodiment. Note that the auxiliary display area forming unit 314 sets the height of the auxiliary display areas as the threshold for discriminating between a signal and a noise.

Figure 25:
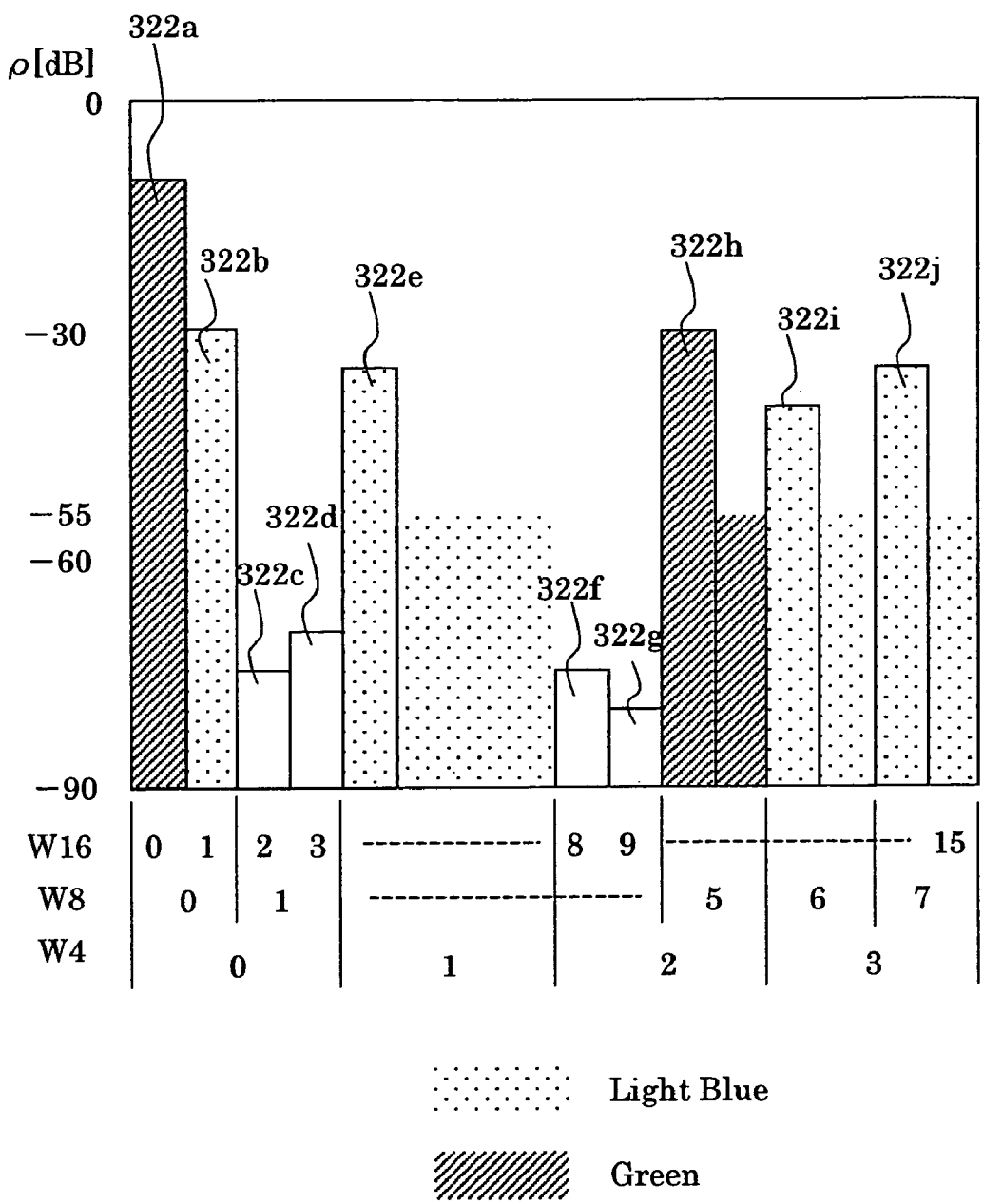
FIG. 25 shows a coloring example of the auxiliary display areas and the bar charts.
Figure 26:
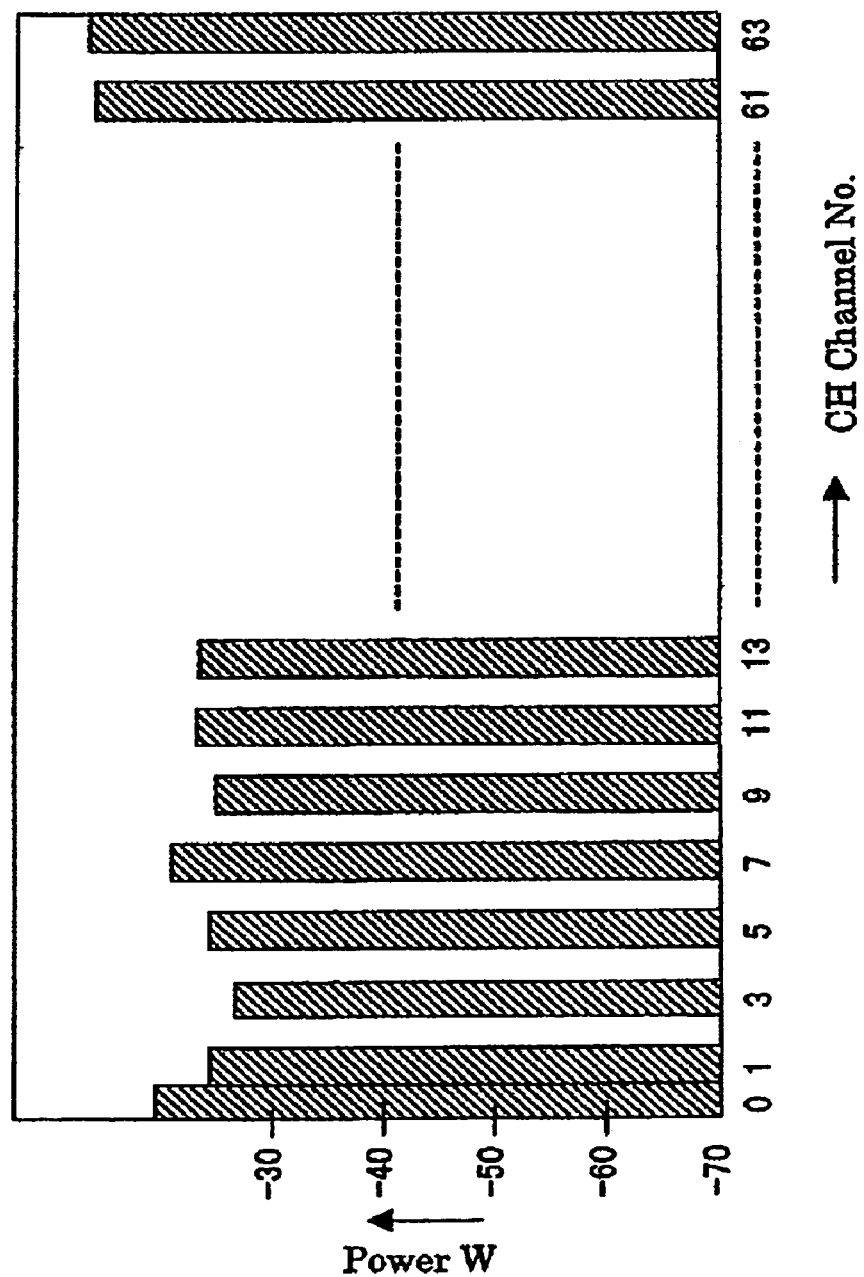
FIG. 26 shows an example of a display of a measurement result of code domain powers of CDMA communication method according to prior art.

The chart coloring unit 336 colors active bar charts in the color tones recorded in the color tone recording unit 330. FIG. 25 shows a coloring example. Since the bar chart 322a corresponds to the spreading code length of 16 and the channel 0, and has the modulation method of the QPSK (see FIG. 5), this bar chart is colored in green. Since the bar chart 322b corresponds to the spreading code length of 16 and the channel 1, and has the modulation method of the BPSK (see FIG. 5), this bar chart is colored in light blue. Other bar charts are colored in the same manner. Note that the method of modulation is not recorded for the areas where a noise is present (see FIG. 5), and their bar charts are not colored. Therefore, colored bar charts are only 322a, 322b, 322e, 322h, 322i, and 322j where a signal is present.

While the present embodiment is constituted such that the bar charts are colored, it is possible to constitute such that the bar charts 322a, 322b, 322e, 322h, 322i, and 322j may be changed to other display form such as a predetermined pattern.

The operation of the fifth embodiment is similar to that of the third embodiment. Note that when the bar chart with the minimum width is shown (S14), the chart coloring unit 336 colors the bar chart.

According to the fifth embodiment, since the auxiliary display areas 314a to 314j are disposed at the bottom of the display areas, they have the widths corresponding to the spreading code lengths. Additionally, the auxiliary display area coloring unit 334 colors them. Thus, even when measurement data such as code domain powers on a plurality of kinds of code layers are simultaneously shown, it is possible to tell to which code layer the code domain power and the like belong. Additionally, since a bar chart of a channel on which a signal is present is colored, it is easy to recognize on which channel a signal is present. Further, the color tones of the auxiliary display areas indicate the modulation methods of the respective channels.

Note that, in a computer including a CPU, a hard disk, and a medium (such as a floppy disk, and a CD-ROM) reading device, the medium reading device can be arranged to be a a program which can emulate the respective parts described above, and to be installed on the hard disk of the embodiments described above. The measurement data displaying device can thus be realized in this alternative manner.

According to the present invention, since the display areas have widths corresponding to the spreading code lengths, it is possible to tell to which code layer a code domain power and the like belong even when measurement data such as the code domain powers and the like for a plurality of kinds of code layers are simultaneously shown.

The invention claimed is:

1. A measurement data displaying device comprising:
a measurement data recording unit for recording a measurement subject channel, a spreading code length corresponding to the measurement subject channel, and measurement data which is a code domain power or a noise component power of the measurement subject channel; and
a chart displaying unit for displaying a chart having a constant width, and representing said measurement data in a display area whose position is determined by said measurement subject channel and said spreading code length, and including a width corresponding to said spreading code length.

2. The measurement data displaying device according to claim 1, further comprising a display form changing unit for changing a display form of said display area depending on whether said measurement subject channel is active or not, wherein said display area is wider than said chart and/or said display area is higher than said chart.

3. The measurement data displaying device according to claim 2, further comprising:
a display form recording unit for recording a display form corresponding to a modulation method related to said measurement subject channel,
wherein said display form changing unit changes said display area into said display form recorded in said display form recording unit.

4. The measurement data displaying device according to claim 2, wherein said display form changing unit colors said display area in a predetermined color tone depending on whether said measurement subject channel is active or not.

5. The measurement data displaying device according to claim 2, wherein said display form changing unit shows said display area in a predetermined pattern depending on whether said measurement subject channel is active or not.

6. The measurement data displaying device according to claim 2, wherein the color of the display area is selectively changed depending on whether the measurement subject channel is active or not.

7. The measurement data displaying device according to claim 6, wherein the color of the display area is changed to light blue.

8. The measurement data displaying device according to claim 1, wherein said display area has ruled lines spaced by the width of said display area.

9. A measurement data displaying device comprising:
a measurement data recording unit for recording a measurement subject channel, a spreading code length corresponding to the measurement subject channel, and measurement data which is a code domain power or a noise component power of the measurement subject channel;
a chart displaying unit for displaying a chart having a constant width, and representing said measurement data in a display area whose position is determined by said measurement subject channel and said spreading code length, and including a width corresponding to said spreading code length;
a display form changing unit for changing a display form of said display area depending on whether said measurement subject channel is active or not, wherein said display area is wider than said chart and/or said display area is higher than said chart, and
wherein said display form changing unit does not change the display form for a display area with the narrowest width whether said measurement subject channel is active or not.

10. A measurement data displaying device comprising:
a measurement data recording unit for recording a measurement subject channel, a spreading code length corresponding to the measurement subject channel, and measurement data which is a code domain power or a noise component power of the measurement subject channel;
a chart displaying unit for displaying a chart having a constant width, and representing said measurement data in a display area whose position is determined by said measurement subject channel and said spreading code length, and including a width corresponding to said spreading code length;
an auxiliary display area forming unit for forming an auxiliary display area disposed at the bottom of said display area, and having a predetermined height;
a display form recording unit for recording a display form corresponding to a modulation method related to said measurement subject channel; and
an auxiliary-display-area display form changing unit for changing said auxiliary display area into said display form recorded in said display form recording unit.

11. The measurement data displaying device according to claim 10, wherein said auxiliary display area has a border line.

12. The measurement data displaying device according to claim 10, further comprising a chart display form changing unit for changing said chart in active form into said display form recorded in said display form recording unit.

13. The measurement data displaying device according to claim 12, wherein the height of said auxiliary display area corresponds to a threshold discriminating whether said measurement subject channel is active or not.

14. The measurement data displaying device according to claim 10, further comprising an auxiliary-display-area display form changing unit for changing a display form of said auxiliary display area depending on whether said measurement subject channel is active or not.

15. A measurement data displaying method of a measurement data displaying device having a measurement data recording unit for recording a measurement data and a chart displaying unit for displaying a chart, comprising:
a measurement data recording step for recording in the measurement data recording unit a measurement subject channel, a spreading code length corresponding to the measurement subject channel and measurement data which is a code domain power or a noise component power of the measurement subject channel; and
a chart displaying step for displaying by the chart displaying unit a chart having a constant width, and representing said measurement data in a display area whose position is determined by said measurement subject channel and said spreading code length, and including a width corresponding to said spreading code length.

16. A computer-readable medium having a program of instructions for execution to perform a displaying process by a computer of a measurement data displaying device having a measurement data recording unit for recording a measurement data and a chart displaying unit for displaying a chart, the displaying process comprising:
- a measurement data recording step for recording in the measurement data recording unit a measurement subject channel, a spreading code length corresponding to the measurement subject channel, and measurement data which is a code domain power or a noise component power of the measurement subject channel; and
- a chart displaying step for displaying by the chart displaying unit a chart having a constant width, and representing said measurement data in a display area whose position is determined by said measurement subject channel and said spreading code length, and including a width corresponding to said spreading code length.

* * * * *